(12) United States Patent
Maeda

(10) Patent No.: US 12,365,382 B1
(45) Date of Patent: Jul. 22, 2025

(54) STEERING DEVICE AND MANUFACTURING METHOD OF STEERING DEVICE

(71) Applicant: NSK STEERING & CONTROL, INC., Tokyo (JP)

(72) Inventor: Koki Maeda, Gunma (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 18/851,482

(22) PCT Filed: Mar. 9, 2023

(86) PCT No.: PCT/JP2023/008954
§ 371 (c)(1),
(2) Date: Sep. 26, 2024

(87) PCT Pub. No.: WO2023/189339
PCT Pub. Date: Oct. 5, 2023

(30) Foreign Application Priority Data

Mar. 29, 2022 (JP) ................... 2022-053061

(51) Int. Cl.
*B62D 1/181* (2006.01)
*B62D 1/185* (2006.01)

(52) U.S. Cl.
CPC ............. *B62D 1/181* (2013.01); *B62D 1/185* (2013.01)

(58) Field of Classification Search
CPC ................................ B62D 1/181; B62D 1/185
See application file for complete search history.

(56) References Cited

U.S. PATENT DOCUMENTS

| 8,910,976 | B2 | 12/2014 | Toyoda et al. | |
|---|---|---|---|---|
| 11,167,785 | B1* | 11/2021 | Beach | F16H 25/20 |
| 2005/0081675 | A1* | 4/2005 | Oshita | B62D 1/181 |
| | | | | 74/492 |

(Continued)

FOREIGN PATENT DOCUMENTS

| EP | 3 064 789 A1 | 9/2016 |
|---|---|---|
| JP | 2013-067311 A | 4/2013 |

(Continued)

OTHER PUBLICATIONS

International Search Report in International Application No. PCT/JP2023/008954, dated May 30, 2023.

(Continued)

*Primary Examiner* — Drew J Brown
(74) *Attorney, Agent, or Firm* — Sughrue Mion, PLLC

(57) ABSTRACT

A steering device includes a first steering column, a second steering column, an actuator device, a first attachment portion, and a second attachment portion. The first attachment portion includes an opening portion and a housing portion including a second arc portion. A protrusion portion has a first arc portion and a linear portion, and the first attachment portion has the opening portion and the housing portion. A minimum width of the opening portion in the first attachment portion is defined as a first distance, and a minimum distance between two intersections of a straight line passing through a center of the housing portion and an edge of the housing portion is defined as a second distance.

11 Claims, 15 Drawing Sheets

(56) References Cited

U.S. PATENT DOCUMENTS

| 2013/0074638 A1* | 3/2013 | Morinaga | B62D 1/181 |
| | | | 74/493 |
| 2013/0075190 A1* | 3/2013 | Toyoda | B62D 1/181 |
| | | | 180/444 |
| 2018/0251147 A1 | 9/2018 | Heitz et al. | |
| 2021/0129888 A1 | 5/2021 | Huber et al. | |

FOREIGN PATENT DOCUMENTS

| JP | 5796776 B2 | 8/2015 |
| JP | 2015-214181 A | 12/2015 |
| JP | 2017-226361 A | 12/2017 |
| JP | 2020-172206 A | 10/2020 |
| WO | 2015/064460 A1 | 5/2015 |

OTHER PUBLICATIONS

Written Opinion in International Application No. PCT/JP2023/008954, dated May 30, 2023.

* cited by examiner

STEERING DEVICE AND MANUFACTURING METHOD OF STEERING DEVICE

This is a National Stage of International Application No. PCT/JP2023/008954 filed Mar. 9, 2023, claiming priority based on Japanese Patent Application No. 2022-053061 filed Mar. 29, 2022.

FIELD

The present disclosure relates to a steering device and a manufacturing method of the steering device.

BACKGROUND

A steering device includes, for example, a first steering column provided outside a steering shaft, a second steering column provided outside the first steering column, and an actuator device (driving mechanism) that changes an axial distance between the first steering column and the second steering column (see, for example, Patent Literature 1). One end portion of the actuator device is attached to the first steering column, and the other end portion is attached to the second steering column. Specifically, a bracket having a notch portion is provided in the first steering column, and a nut having a protrusion portion is provided in the one end portion of the actuator device. The protrusion portion of the nut is fitted into the notch portion of the bracket.

Here, in Patent Literature 1, when viewed from a side, the actuator device extends in a manner of crossing an axial direction (horizontal direction) of the steering shaft obliquely downward. Specifically, the actuator device is inclined downward toward a rear side of a vehicle. Thus, for example, in a case where the position in the nut in the actuator device moves to a rear side, force from the protrusion portion is applied obliquely downward with respect to the notch portion. Since the obliquely downward force is divided into horizontal component force and downward component force, and the downward component force is also transmitted to the notch portion, the notch portion a lower side of which is opened is deformed and easily opened.

CITATION LIST

Patent Literature

Patent Literature 1: Japanese Patent No. 5796776

SUMMARY

Technical Problem

As described above, in Patent Literature 1, a gap is likely to be generated between the protrusion portion of the actuator device and the notch portion of the bracket. When the gap is generated, there is a possibility that the protrusion portion and the notch portion interfere with each other during traveling of the vehicle and abnormal noise is generated. Thus, work of inserting a bush into the gap and eliminating the gap is necessary, and there is a concern about an increase in cost due to an increase in the number of parts and assembly processes.

The present disclosure has been made in view of the above problem, and an object thereof is to provide a steering device and a manufacturing method of the steering device in which a gap is less likely to be generated between an attachment portion of a steering column and a protrusion portion of an actuator device by simpler work.

Solution to Problem

To achieve the above object, a steering device according to an embodiment of the present disclosure comprising:
a tubular first steering column that is arranged outside a steering shaft extending in a first direction and has a first attachment portion;
a tubular second steering column that is arranged outside the first steering column and has a second attachment portion arranged on one side in the first direction with respect to the first attachment portion; and
an actuator device that includes a first fixation portion attached to one of the first attachment portion or the second attachment portion and a second fixation portion attached to other of the first attachment portion or the second attachment portion, and changes a relative distance between the first fixation portion and the second fixation portion in the first direction, wherein
the first attachment portion or the second attachment portion includes an inlet-side opening portion and a housing portion that communicates with the opening portion,
the first fixation portion includes a protrusion portion protruding in a second direction intersecting with the first direction,
when viewed in the second direction, the protrusion portion has a first arc portion and a linear portion and can be housed in the housing portion, the linear portion extending in the first direction in a state in which the protrusion portion is housed in the housing portion, and
in a state in which the first fixation portion is detached from the first attachment portion or the second attachment portion and the linear portion extends in the first direction,
when viewed in the second direction, a first distance that is a maximum distance in the first direction in the protrusion portion is longer than a second distance that is a maximum distance in the first direction in the housing portion.

As described above, in Patent Literature 1, the actuator device extends in a manner of crossing an axial direction (horizontal direction) of the steering shaft obliquely downward. For example, force from the protrusion portion of the actuator device is obliquely applied to the notch portion to open the notch portion, and a gap is likely to be generated between the protrusion portion and the notch portion. Thus, work of inserting a bush into the gap and eliminating the gap becomes necessary, and there is a concern about an increase in cost due to an increase in the number of parts and assembly processes.

On the other hand, in the present disclosure, a linear portion of a protrusion portion extends in a first direction in a state in which the protrusion portion is housed in a housing portion. In addition, an actuator device is arranged substantially parallel to a first steering column and a second steering column. Thus, since force from the protrusion portion of the actuator device is applied to the housing portion in the first direction, an opening portion and the housing portion are less likely to open.

Furthermore, in the present disclosure, since a first distance that is a maximum distance in the first direction of the protrusion portion is longer than a second distance that is a minimum distance in the first direction in the housing portion, the protrusion portion is pressed inward from an edge of the housing portion in a state in which the protrusion portion is fitted to the housing portion. As described above, according to the present disclosure, it is possible to provide a steering device in which a gap is less likely to be generated between the attachment portion of the steering column and the protrusion portion of the actuator device by simpler work.

In another embodiment of the present disclosure,
in a case where a minimum width of the opening portion in the first attachment portion or the second attachment portion is defined as a third distance,
the housing portion includes a second arc portion,
a minimum distance between two intersections of a straight line passing through a center of the second arc portion and an inner wall portion facing the housing portion is defined as a fourth distance, and
a maximum distance between two intersections of a straight line passing through a center of the first arc portion of the protrusion portion and an edge of the protrusion portion is defined as a fifth distance and a minimum distance is defined as a sixth distance,
in a state in which the first fixation portion is detached from the first attachment portion or the second attachment portion,
the sixth distance is shorter than the third distance, and
the fifth distance is longer than the fourth distance.

As described above, since the sixth distance is shorter than the third distance, the protrusion portion is easily inserted into the opening portion. Since the fifth distance is longer than the fourth distance, the protrusion portion is pressed inward from the edge of the housing portion in a state in which the protrusion portion is fitted to the housing portion. Thus, a gap is less likely to be generated between the housing portion and the protrusion portion.

In another embodiment of the present disclosure,
the first attachment portion or the second attachment portion includes a first holding portion and a second holding portion arranged on one side and other side in the first direction with the opening portion and the housing portion being interposed therebetween, and
distances of the first holding portion and the second holding portion in the first direction are same. Therefore, rigidity of the first holding portion and the second holding portion in the first direction becomes uniform. That is, the force of the protrusion portion is applied to the edge of the housing portion from both sides in the first direction in cases where the first fixation portion in the actuator device becomes away from and close to the second fixation portion in an axial direction. Thus, in both the case where the first fixation portion becomes away from the second fixation portion and the case where the first fixation portion becomes close to the second fixation portion, rigidity against the force of the protrusion portion becomes uniform on the both sides in the first direction, and durability of the first attachment portion or the second attachment portion is improved.

In another embodiment of the present disclosure, the first attachment portion or the second attachment portion is provided with a pair of inlet wall portions facing the opening portion, and
when viewed in the second direction,
each of the pair of inlet wall portions extends in a third direction intersecting with the first direction and the second direction. The protrusion portion has the linear portion, and the inlet wall portions extend in the third direction. Thus, by inserting the protrusion portion from the opening portion in a state in which the linear portion of the protrusion portion is substantially parallel to the inlet wall portions, it becomes possible to fit the protrusion portion into the housing portion more easily.

In another embodiment of the present disclosure, the first attachment portion or the second attachment portion is provided with a pair of inlet wall portions facing the opening portion, and
when viewed in the second direction,
each of the pair of inlet wall portions
is inclined in such a manner that a distance in the first direction decreases from one side to another side in a third direction. As described above, since the opening portion is wide on an inlet side, there is an advantage that the protrusion portion is easily inserted into the opening portion.

In another embodiment of the present disclosure, the first attachment portion or the second attachment portion is provided with a pair of inlet wall portions facing the opening portion, and
when viewed in a third direction,
a boundary portion between the inlet wall portions and an inner wall portion facing the housing portion is a curved portion. Thus, in a case where the protrusion portion is rotated in a state in which the protrusion portion is fitted to the housing portion, the protrusion portion is less likely to be caught at a boundary portion between the inlet wall portions and the inner wall portion, and the protrusion portion can be more smoothly fitted to the housing portion.

In another embodiment of the present disclosure, a projection portion is provided in the first arc portion of the protrusion portion. Since the projection portion is provided on the protrusion portion, when the protrusion portion is rotated in a state in which the protrusion portion is fitted to the housing portion, the projection portion more securely abuts on an edge of the housing portion, and the projection portion is easily crushed. In a case where this crush is generated, the gap between the protrusion portion and the housing portion can be more effectively controlled. That is, when an entire surface of the first arc portion of the protrusion portion is moved outward in the radial direction and the first arc portion having a large diameter is formed, the first arc portion and the housing portion abut on each other over a large area. In this case, when a curvature radius of the first arc portion varies, the entire surface of the first arc portion is less likely to uniformly abut on the housing portion. On the other hand, since the projection portion has a smaller abutment area with the housing portion than the entire surface of the first arc portion, the projection portion more securely abuts on the housing portion, and a gap is less likely to be generated between the protrusion portion and the housing portion.

In another embodiment of the present disclosure, a nut includes a nut main body portion and the protrusion portion, the protrusion portion being provided on each side of the nut main body portion in the second direction, and
the projection portion is provided on the protrusion portion on one side in the second direction. In a case of an aspect in which a projection portion is provided on each of one protrusion portion and the other protrusion portion, press fit margins of both the protrusion portions and a housing portion are increased. In this case, when a posture of a nut is twisted, a screw shaft and the nut are easily engaged with each other, and there is a possibility that it becomes difficult for the screw shaft to rotate smoothly.

However, according to the present disclosure, since the projection portion is not provided on one of the two protrusion portions, the posture of the nut is less likely to be twisted, and the screw shaft and the nut are less likely to be engaged. Thus, it is possible to obtain both an effect that the screw shaft rotates smoothly due to the protrusion portion not provided with the projection portion and an effect that abutment of the projection portion and the housing portion is secured more by the protrusion portion provided with the projection portion and the generation of the gap between the protrusion portion and the housing portion is more effectively controlled.

In another embodiment of the present disclosure, a projecting portion projecting toward an inner peripheral side is provided on an inner periphery of an inner wall portion facing the housing portion in the first attachment portion or the second attachment portion. Since the projecting portion is provided on the inner periphery of the inner wall portion, the projecting portion and the protrusion portion more securely abut on each other when the protrusion portion is rotated in a state in which the protrusion portion is housed in the housing portion, and generation of a gap between the protrusion portion and the housing portion can be more effectively controlled.

A manufacturing method of a steering device according to an embodiment of the present disclosure, the steering device including
- a tubular first steering column that is arranged outside a steering shaft extending in a first direction and that has a first attachment portion,
- a tubular second steering column that is arranged outside the first steering column and has a second attachment portion arranged on one side in the first direction with respect to the first attachment portion, and
- an actuator device that includes a first fixation portion attached to one of the first attachment portion or the second attachment portion and a second fixation portion attached to other of the first attachment portion or the second attachment portion, and that changes a relative distance between the first fixation portion and the second fixation portion in the first direction,
- the first attachment portion or the second attachment portion including an inlet-side opening portion and a housing portion communicating with the opening portion,
- the first fixation portion including a protrusion portion protruding in a second direction intersecting with the first direction,
- when viewed in the second direction, the protrusion portion having a first arc portion and a linear portion and being able to be housed in the housing portion, and the linear portion extending in the first direction in a state in which the protrusion portion is housed in the housing portion, and
- in a state in which the first fixation portion is detached from the first attachment portion or the second attachment portion,
- a first distance in the first direction in the protrusion portion being longer than a second distance in the first direction in the housing portion when viewed in the second direction, the manufacturing method comprising:
- a first step of arranging the actuator device in such a manner that the first fixation portion is located on one side in a third direction, which intersects with the first direction and the second direction, with respect to the one of the first attachment portion or the second attachment portion in a state in which the linear portion of the protrusion portion is in the third direction;
- a second step of moving the actuator device toward other side in the third direction and inserting the protrusion portion of the first fixation portion into the housing portion from the opening portion after the first step;
- a third step of swinging the actuator device about the protrusion portion and fitting the protrusion portion into the housing portion after the second step; and
- a fourth step of attaching the second fixation portion to the other of the first attachment portion or the second attachment portion after the third step.

As described above, it is possible to manufacture the steering device in which the gap is less likely to be generated between the housing portion and the protrusion portion by a simple method in which the protrusion portion of the actuator device is inserted into the housing portion of one of the first attachment portion or the second attachment portion and the actuator device is then swung.

Advantageous Effects of Invention

According to the steering device and the manufacturing method of the steering device of the present disclosure, it is possible to provide the steering device in which a gap is less likely to be generated between the attachment portion of the steering column and the protrusion portion of the actuator device by simpler work.

DESCRIPTION OF EMBODIMENTS

Hereinafter, the present invention will be described in detail with reference to the drawings. Note that the present invention is not limited by the following modes for carrying out the invention (hereinafter, referred to as embodiments). In addition, components in the following embodiments include what can be easily assumed by those skilled in the art, what are substantially the same, and what is within a so-called equivalent range. Furthermore, the components disclosed in the following embodiments can be appropriately combined. Note that in XYZ orthogonal coordinates, a Y direction is orthogonal to (intersects with) an X direction. A Z direction is orthogonal to (intersects with) the X direction and the Y direction. An X1 side is on an opposite side of an X2 side, a Y1 side is an opposite side of a Y2 side, and a Z1 side is an opposite side of a Z2 side. In the following description, the X direction corresponds to a first direction, the Z direction corresponds to a second direction, and the Y direction corresponds to a third direction. The X1 side is one side in the first direction, the X2 side is the other side in the first direction, the Z1 side is one side in the second direction, the Z2 side is the other side in the second direction, the Y1 side is one side in the third direction, and the Y2 side is the other side in the third direction.

First Embodiment

Figure 1:
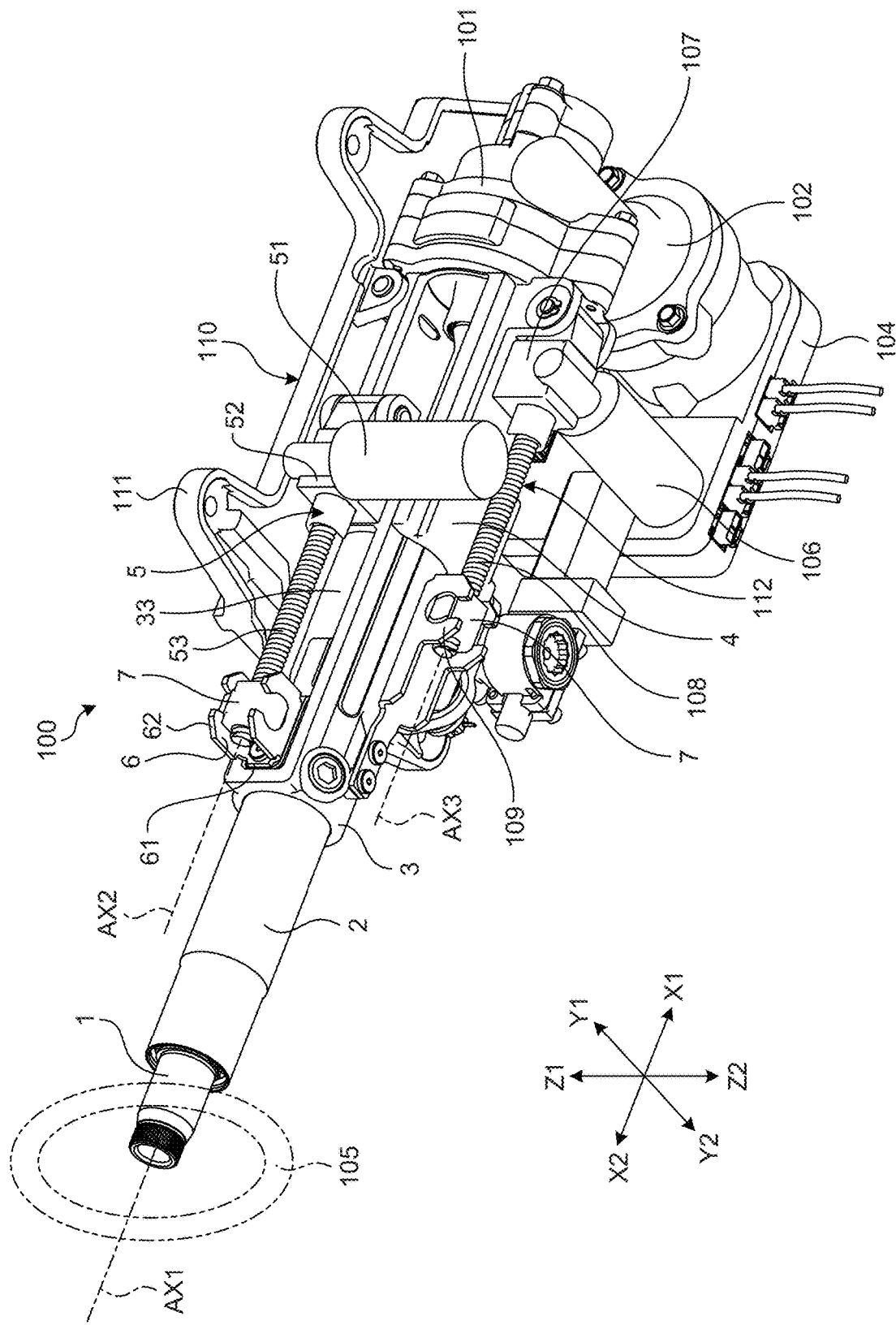
FIG. 1 is a perspective view of a steering device in a first embodiment.

FIG. 1 is a perspective view of a steering device in the first embodiment. As illustrated in FIG. 1, a steering device 100 includes a steering shaft 1, a first steering column 2, a second steering column 3, a third steering column 4, and actuator devices 5 and 112.

As illustrated in FIG. 1, a steering wheel 105 is coupled to a rear end portion of the steering shaft 1. When a driver operates the steering wheel 105, the steering shaft 1 rotates about a first central axis AX1, and operation torque is applied to the steering shaft 1. In such a manner, the steering shaft 1 is coupled to the steering wheel 105 and extends in the X direction (first direction and axial direction).

The steering shaft 1 is inserted into an inner periphery of the first steering column 2. In other words, the tubular first steering column 2 is arranged outside the steering shaft 1. The first steering column 2 and the steering shaft 1 can relatively move in the X direction.

The first steering column 2 is inserted inside the second steering column 3. In other words, the second steering column 3 having a tubular shape is arranged outside the first steering column 2. The first steering column 2 and the second steering column 3 can relatively move in the X direction via the actuator device 5. The actuator device 5 extends in the X direction (first direction) that is an axial direction of a second central axis AX2. The actuator device 5 couples the first steering column 2 and the second steering column 3 and changes an axial distance (first direction distance) between the first steering column 2 and the second steering column 3. The actuator device 5 will be described later in detail.

The second steering column 3 is arranged inside the third steering column 4. Since a side of the third steering column 4 is opened, a cross-sectional shape of the third steering column 4 is substantially U-shaped. The second steering column 3 and the third steering column 4 can relatively move in the X direction via the actuator device 112. The actuator device 112 extends in the X direction (first direction) that is an axial direction of a third central axis AX3. The actuator device 112 includes a motor 106, a gear box 107, and a screw shaft 108. The gear box 107 is attached to the third steering column 4. The gear box 107 houses a worm gear mechanism in which a worm shaft provided on an output shaft of the motor 106 meshes with a worm wheel provided on the screw shaft 108. The worm gear mechanism causes rotational driving of the motor 106 to be rotation of the screw shaft 108 via the worm shaft and the worm wheel. The screw shaft 108 is engaged with a nut (not illustrated), and the nut is fitted to a bracket 109 of the second steering column 3. As a result, the second steering column 3 and the third steering column 4 can relatively move in the X direction.

Note that the third steering column 4 is provided with a gear box 101, an electric motor 102, and an ECU 104. A worm shaft and a worm wheel of the electric motor 102 are housed inside the gear box 101, and the worm shaft and the worm wheel mesh with each other. The ECU 104 controls operation of the electric motor 102. Auxiliary torque is applied to the steering shaft 1 by the ECU 104 and the electric motor 102. That is, the steering device 100 of the present embodiment is an electric power steering device that assists steering by the driver with the electric motor 102.

Figure 2:
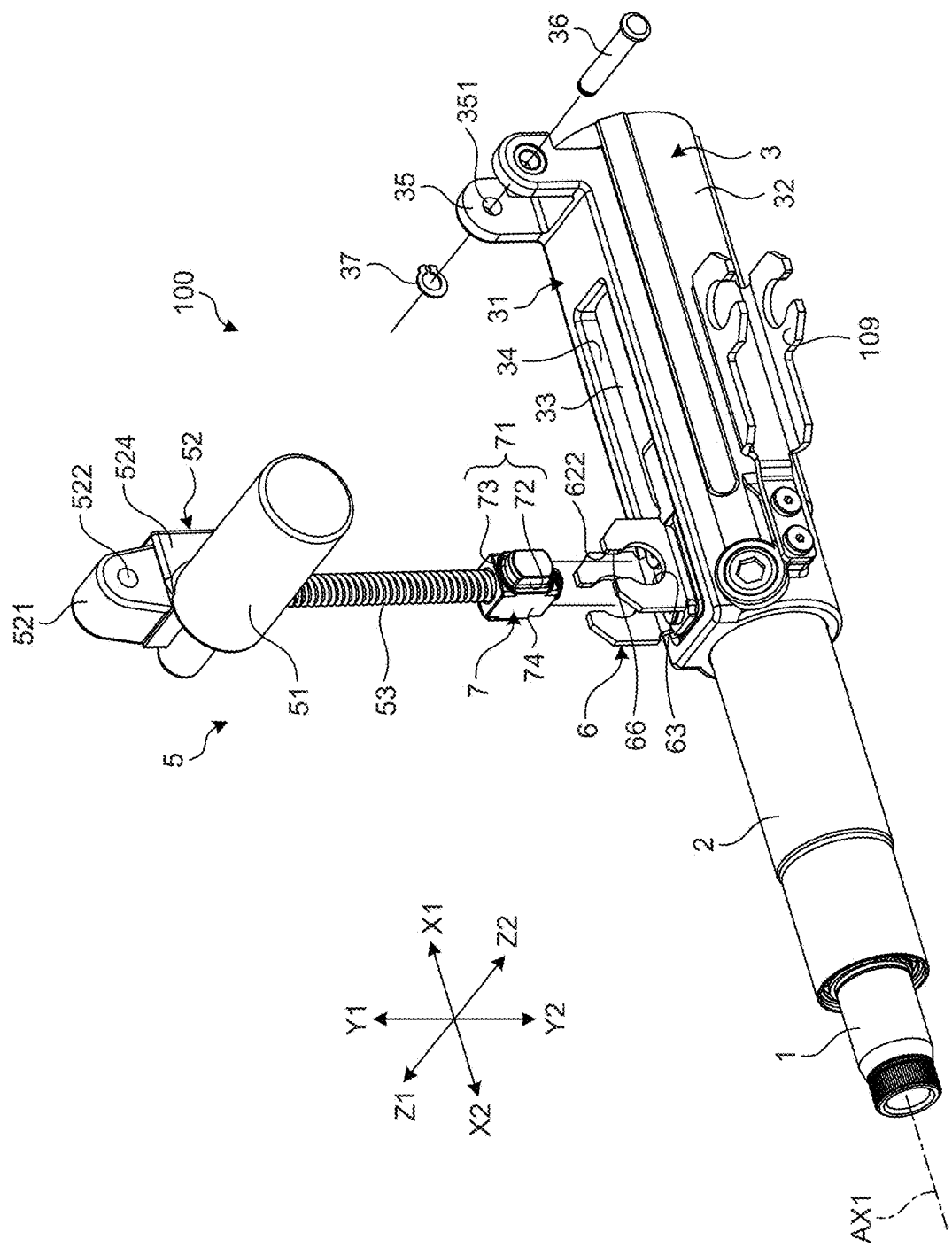
FIG. 2 is a perspective view illustrating a part of the steering device in FIG. 1, and is a view illustrating a state in which an actuator device is detached.
Figure 3:
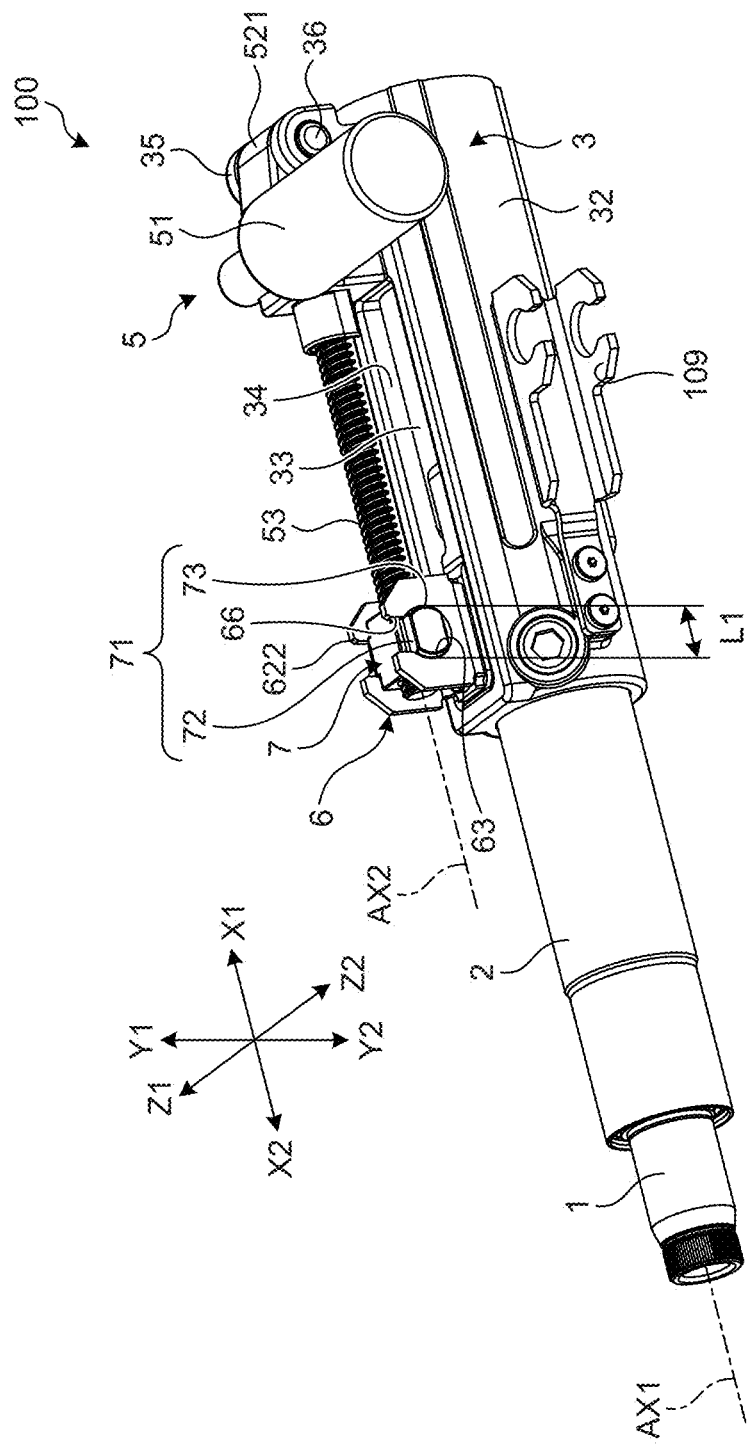
FIG. 3 is a perspective view illustrating a part of the steering device in FIG. 1, and is a view illustrating a state in which the actuator device is assembled.

FIG. 2 is a perspective view illustrating a part of the steering device in FIG. 1, and is a view illustrating a state in which the actuator device is detached. FIG. 3 is a perspective view illustrating a part of the steering device in FIG. 1, and is a view illustrating a state in which the actuator device is assembled.

As illustrated in FIG. 2 and FIG. 3, the tubular second steering column 3 is arranged outside the first steering column 2, and an open portion 33 is provided in a side portion thereof. A flat portion 31 and a curved portion 32 are provided in the second steering column 3. The flat portion 31 is a plane extending in the X direction and the Z direction. The open portion 33 is arranged closer to the X2 side in the flat portion 31. The open portion 33 has a rectangular shape when viewed in the Y direction. Specifically, an inner peripheral wall portion 34 facing the open portion 33 has a rectangular shape elongated in the X direction. A flange 35 (second attachment portion) protruding to the Y1 side is provided at an end portion of the flat portion 31 on the X1 side. The one flange 35 is provided on each of the Z1 side and the Z2 side. A through hole 351 is provided in each of the two flanges 35. A pin 36 is inserted into the through holes 351. A through hole 522 is provided in a protruding portion 521 of the actuator device 5. The pin 36 penetrates the through holes 351 of the flanges 35 and the through hole 522 of the protruding portion 521. A snap ring 37 is fitted to an end portion of the pin 36. The bracket 109 is attached to the Z2 side of the second steering column 3.

In addition, as illustrated in FIG. 2 and FIG. 3, a bracket 6 (first attachment portion) protruding to the Y1 side is provided on a side surface of the first steering column 2. The bracket 6 protrudes from the open portion 33 to the Y1 side and is exposed. A nut 7 is attached to the bracket 6. Note that a material of the nut 7 is, for example, resin, and a material of the bracket 6 is, for example, metal. However, the material of the nut 7 may be metal, and the material of the bracket 6 may be resin.

As illustrated in FIGS. 2 and 3, the actuator device 5 includes a motor 51, a gear box 52 (second fixation portion), a screw shaft 53, the nut 7 (first fixation portion), and the bracket 6. A worm shaft (not illustrated) of the motor 51 and a worm wheel (not illustrated) attached to the screw shaft 53 are housed inside a housing 524 of the gear box 52, and the worm shaft and the worm wheel are meshed with each other. The protruding portion 521 is provided on the housing 524. A male screw is formed on an outer periphery of the screw shaft 53. A female screw is formed in an inner periphery of the nut 7, and the female screw meshes with the male screw of the screw shaft 53. In such a manner, one side in the axial direction (longitudinal direction) of the screw shaft 53 is attached to the flanges 35 via the gear box 52, and the nut 7 is attached to the other side in the axial direction (longitudinal direction) of the screw shaft 53 in a meshed state. The nut 7 includes a nut main body portion 74 and a protrusion portion 71. The protrusion portion 71 protrudes from the nut main body portion 74 to the Z1 side and the Z2 side. The protrusion portion 71 has a first arc portion 73 and a linear portion 72 when viewed in the Z direction. Note that when the motor 51 operates and the worm shaft rotates, the worm wheel also rotates. Then, since the screw shaft rotates together with the worm wheel, the nut 7 meshed with the screw shaft moves in the axial direction (X direction and first direction). As a result, a relative distance in the X direction between the nut 7 (first fixation portion) and the gear box 52 (second fixation portion) changes.

Figure 4:
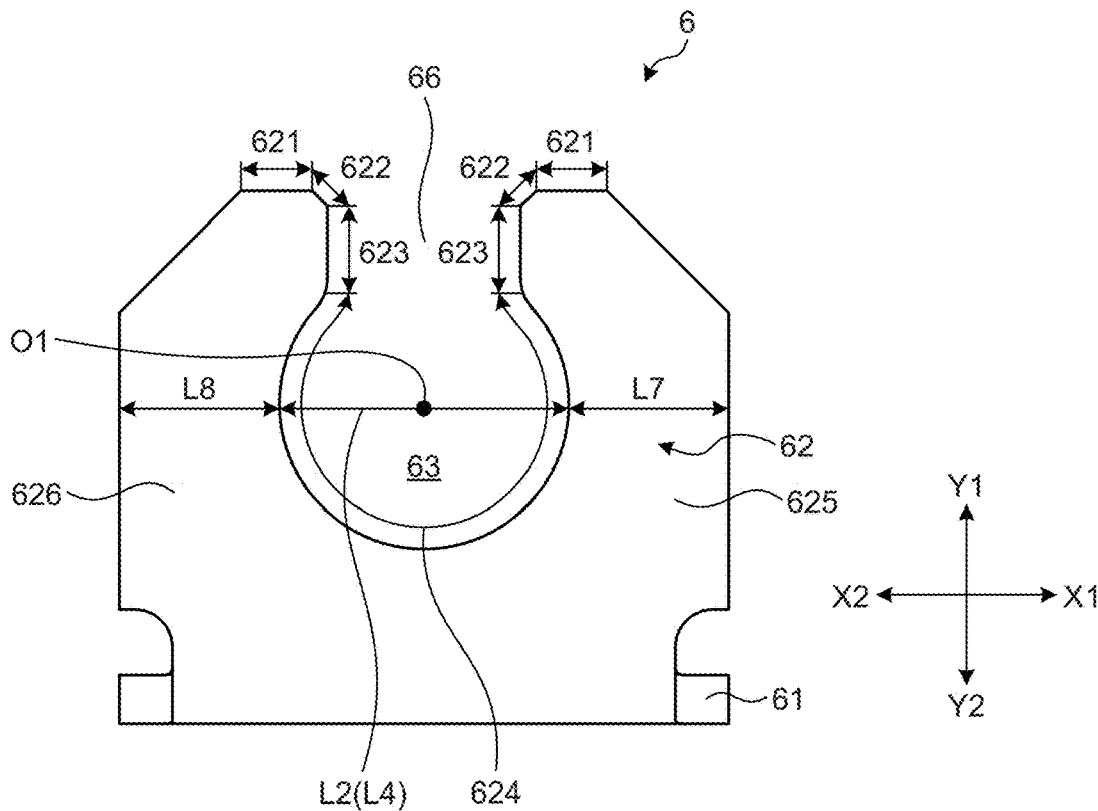
FIG. 4 is a plan view of a bracket of FIG. 1.
Figure 5:
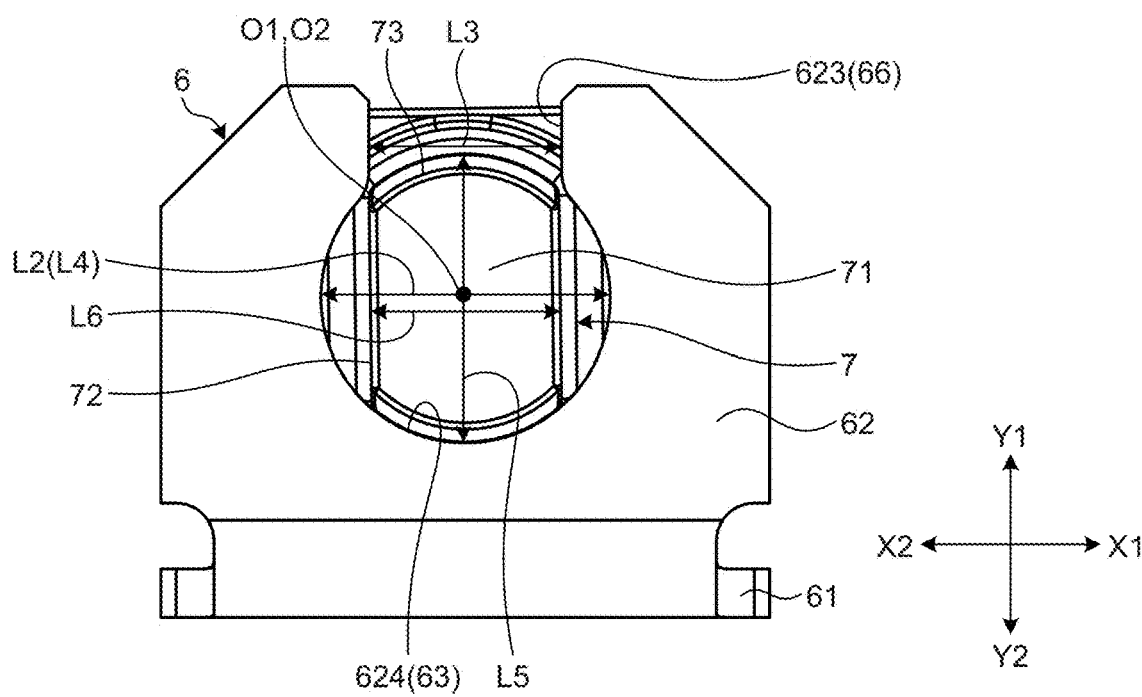
FIG. 5 is a schematic diagram illustrating a state in which a protrusion portion of a nut in the actuator device is inserted into the bracket of FIG. 4.
Figure 6:
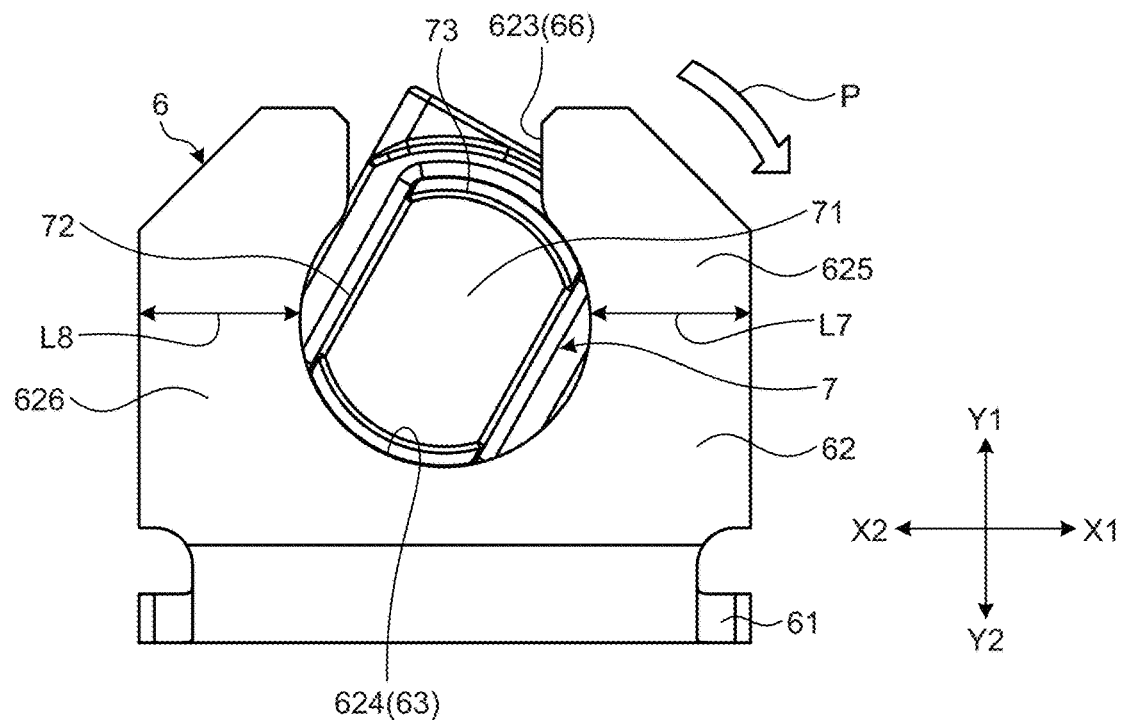
FIG. 6 is a schematic diagram illustrating a state in which the nut of FIG. 5 is rotated.

Next, the bracket 6 will be described. FIG. 4 is a plan view of the bracket of FIG. 1. FIG. 5 is a schematic diagram illustrating a state in which the protrusion portion of the nut in the actuator device is inserted into the bracket of FIG. 4. FIG. 6 is a schematic diagram illustrating a state in which the nut of FIG. 5 is rotated.

The bracket 6 includes an attachment portion 61 and a plate portion 62. As illustrated in FIG. 2, the attachment portion 61 is fixed to the side surface of the first steering column 2. The plate portion 62 protrudes to the Y1 side from both end portions of the attachment portion 61.

As illustrated in FIG. 4, an opening portion 66 and a housing portion 63 are provided in the plate portion 62 when viewed in the Z direction. The protrusion portion 71 of the nut 7 can be inserted from the opening portion 66. A pair of inlet wall portions 623 facing the opening portion 66 is provided in the plate portion 62. Specifically, a top surface portion 621, a corner portion 622, the inlet wall portions 623, and a second arc portion 624 (inner wall portion) are provided in the plate portion 62. The top surface portion 621 extends in the X direction. The corner portion 622 extends obliquely in the Y direction and the X direction. The corner portion 622 on the X1 side extends obliquely to the Y2 side and the X2 side. The corner portion 622 on the X2 side extends obliquely to the Y2 side and the X1 side. The inlet wall portions 623 extend in the Y direction. The inlet wall portion 623 on the X1 side and the inlet wall portion 623 on the X2 side extend substantially in parallel. The second arc portion 624 extends in an arc shape in a circumferential direction around an axis centered on a center O1. The second arc portion 624 faces the housing portion 63. The second arc portion 624 is also referred to as an inner wall portion. The first arc portion 73 of the protrusion portion 71 of the nut 7 extends in an arc shape along the second arc portion 624 of the bracket 6.

Here, as illustrated in FIG. 3, the linear portion 72 extends in the X direction in a state in which the protrusion portion 71 is housed in the housing portion 63. When viewed in the Z direction, in a state in which the protrusion portion 71 is detached from the bracket 6 and the linear portion 72 extends in the X direction, a maximum distance in the X direction in the protrusion portion 71 is a first distance L1. In addition, as illustrated in FIG. 4, a maximum distance in the first direction in the housing portion 63 is a second distance L2. Specifically, a diameter of a circle along the second arc portion 624 is the second distance L2. The first distance L1 is longer than the second distance L2.

Note that as illustrated in FIG. 4 and FIG. 6, the bracket 6 includes a first holding portion 625 and a second holding portion 626 arranged on the X1 side and the X2 side with the opening portion 66 and the housing portion 63 interposed therebetween. In the first holding portion 625, a width in the X direction which width passes through the center O1 and is in the X direction is a seventh distance L7. In the second holding portion 626, a width in the X direction passing through the center O1 in the X direction is an eighth distance L8. The seventh distance L7 and the eighth distance L8 are the same.

In addition, as illustrated in FIG. 5, a minimum width of the opening portion 66 is a third distance L3. Specifically, a distance between the pair of inlet wall portions 623 in the X direction is the third distance L3. In addition, a minimum distance between two intersections of a straight line passing through the center O1 of the second arc portion 624 in the housing portion 63 and the inner wall portion (edge) of the housing portion 63 is a fourth distance L4. Specifically, a diameter of the circle along the second arc portion 624 is the fourth distance L4. In addition, a maximum distance between two intersections of a straight line passing through a center O2 of the first arc portion 73 of the protrusion portion 71 and an edge of the protrusion portion 71 is defined as a fifth distance L5, and a minimum distance is defined as a sixth distance L6. In a state in which the protrusion portion 71 of the nut 7 is detached from the bracket 6, the sixth distance L6 is shorter than the third distance L3, and the fifth distance L5 is longer than the fourth distance L4.

Next, a manufacturing method of the steering device 100 will be briefly described. Specifically, the actuator device 5 is attached to the bracket 6 and the flange 35 in the method.

First, in a first step, as illustrated in FIG. 2, the actuator device 5 is arranged in such a manner that the linear portion 72 of the protrusion portion 71 of the nut 7 is in the Y direction and the protrusion portion 71 is placed on the Y1 side with respect to the bracket 6. Specifically, the actuator device 5 is arranged in such a manner as to be orthogonal to the first central axis AX1.

In a second step, the actuator device 5 is moved toward the Y2 side, and the protrusion portion 71 of the nut 7 is inserted into the housing portion 63 from the opening portion 66 of the bracket 6 as illustrated in FIG. 5. In this state, the first arc portion 73 of the protrusion portion 71 of the nut 7 abuts on the second arc portion 624 of the bracket 6.

In a third step, as indicated by an arrow P in FIG. 6, the actuator device 5 is swung about the protrusion portion 71 and the protrusion portion 71 is fitted into the housing portion 63.

In a fourth step, as illustrated in FIG. 3, the gear box 52 is attached to the flange 35. Specifically, as illustrated in FIG. 2, the pin 36 is caused to penetrate the through holes 351 of the flanges 35 and the through hole 522 of the protruding portion 521, and then the snap ring 37 is fitted to the end portion of the pin 36.

As described above, in the steering device 100, the nut 7 (first fixation portion) has the protrusion portion 71, and the protrusion portion 71 is attached to the bracket 6 (first attachment portion). The protrusion portion 71 has the first arc portion 73 and the linear portion 72. The bracket 6 has the opening portion 66 and the housing portion 63, and the housing portion 63 has the second arc portion 624 (inner wall portion). When viewed in the Z direction, in a state in which the protrusion portion 71 is detached from the bracket 6 and the linear portion 72 extends in the X direction, the maximum distance in the X direction in the protrusion portion 71 is the first distance L1. As illustrated in FIG. 4, the minimum distance in the first direction in the housing portion 63 is the second distance L2. Specifically, the diameter of the circle along the second arc portion 624 is the second distance L2. The first distance L1 is longer than the second distance L2.

As described above, in Patent Literature 1, the actuator device extends in a manner of crossing an axial direction (horizontal direction) of the steering shaft obliquely downward. For example, force from the protrusion portion of the actuator device is obliquely applied to the notch portion to open the notch portion, and a gap is likely to be generated between the protrusion portion and the notch portion. Thus, work of inserting the bush into the gap and eliminating the gap becomes necessary, and there is a concern about an increase in cost due to an increase in the number of parts and assembly processes.

On the other hand, in the present embodiment, the actuator device 5 extends in the X direction substantially in parallel to the first steering column 2 and the second steering column 3. In addition, the linear portion 72 of the protrusion portion 71 extends in the X direction in a state in which the protrusion portion 71 is housed in the housing portion 63. Thus, as illustrated in FIG. 3, since the force from the protrusion portion 71 of the actuator device 5 is applied in the X direction with respect to the housing portion 63, the opening portion 66 and the housing portion 63 become less likely to be opened.

Furthermore, in the present embodiment, since the first distance L1 that is the maximum distance in the X direction in the protrusion portion 71 is longer than the second distance L2 that is the minimum distance in the first direction in the housing portion 63, the protrusion portion 71 is pressed inward from the edge of the housing portion 63 in a state in which the protrusion portion 71 is fitted to the housing portion 63.

As described above, according to the present embodiment, it is possible to provide the steering device 100 in which the gap is less likely to be generated between the attachment portion of the steering column and the protrusion portion 71 of the actuator device 5 by simpler work.

In a state in which the nut 7 (first fixation portion) is detached from the bracket 6 (first attachment portion), the sixth distance L6 is shorter than the third distance L3, and the fifth distance L5 is longer than the fourth distance L4. Since the sixth distance L6 is shorter than the third distance L3, the protrusion portion 71 can be easily inserted into the opening portion 66. In addition, since the fifth distance L5 is longer than the fourth distance L4, the protrusion portion 71 is pressed inward from the edge of the housing portion 63 in a state in which the protrusion portion 71 is fitted to the housing portion 63. Thus, the gap is less likely to be generated between the housing portion 63 and the protrusion portion 71.

Then, the seventh distance L7 and the eighth distance L8 in the X direction of the first holding portion 625 and the second holding portion 626 arranged on the X1 side and the X2 side with the housing portion 63 interposed therebetween are the same. Thus, the force of the protrusion portion 71 is applied to the edge of the housing portion 63 from both the X1 side and the X2 side in cases where the position of the nut 7 in the actuator device 5 becomes away from and close to the gear box 52 (second fixation portion). Thus, in both the case where the nut 7 becomes away from the gear box 52 and the case where the nut 7 becomes close to the gear box 52, the rigidity of the first holding portion 625 and the second holding portion 626 against the force of the protrusion portion 71 becomes uniform, and the durability of the bracket 6 (first attachment portion) is improved.

The bracket 6 is provided with the pair of inlet wall portions 623 facing the opening portion 66, and each of the pair of inlet wall portions 623 extends in the Y direction when viewed from the Z direction. The protrusion portion 71 has a linear portion 72, and the inlet wall portion 623 extends in the Y direction. Thus, by inserting the protrusion portion 71 from the opening portion 66 in a state in which the linear portion 72 of the protrusion portion 71 is substantially parallel to the inlet wall portions 623, it is possible to more easily house the protrusion portion 71 into the housing portion 63.

Then, in the manufacturing method of the steering device 100 which method includes the first step to the fourth step, the actuator device 5 is moved toward the Y2 side, the protrusion portion 71 of the nut 7 is inserted into the housing portion 63 from the opening portion 66 of the bracket 6, and then the actuator device 5 is swung with the protrusion portion 71 as the center and the protrusion portion 71 is fit into the housing portion 63. As described above, it is possible to provide the steering device 100 in which the gap is less likely to be generated between the protrusion portion 71 of the actuator device 5 and the housing portion 63 of the bracket 6 by a simple procedure.

Second Embodiment

Figure 7:
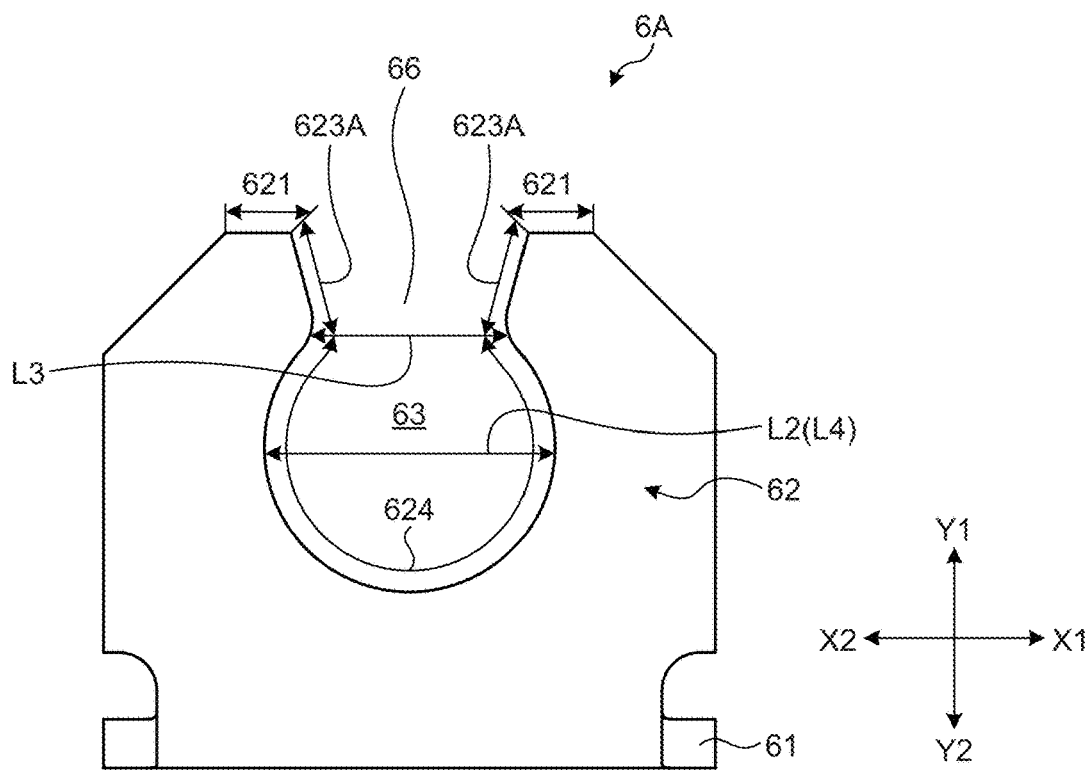
FIG. 7 is a plan view of a bracket in a second embodiment.
Figure 8:
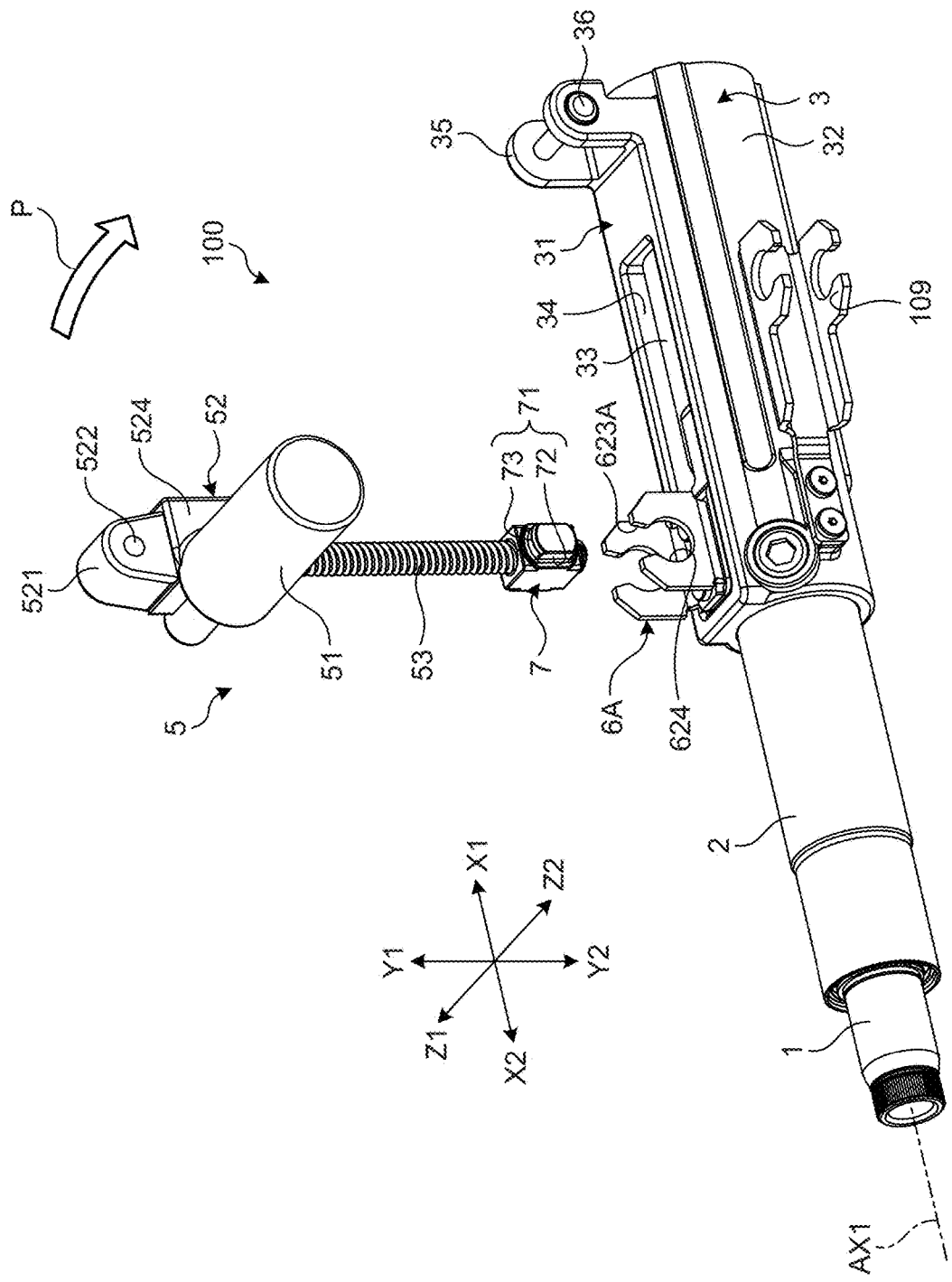
FIG. 8 is a perspective view illustrating a part of a steering device of the second embodiment, and is a view illustrating a state in which an actuator device is detached.
Figure 9:
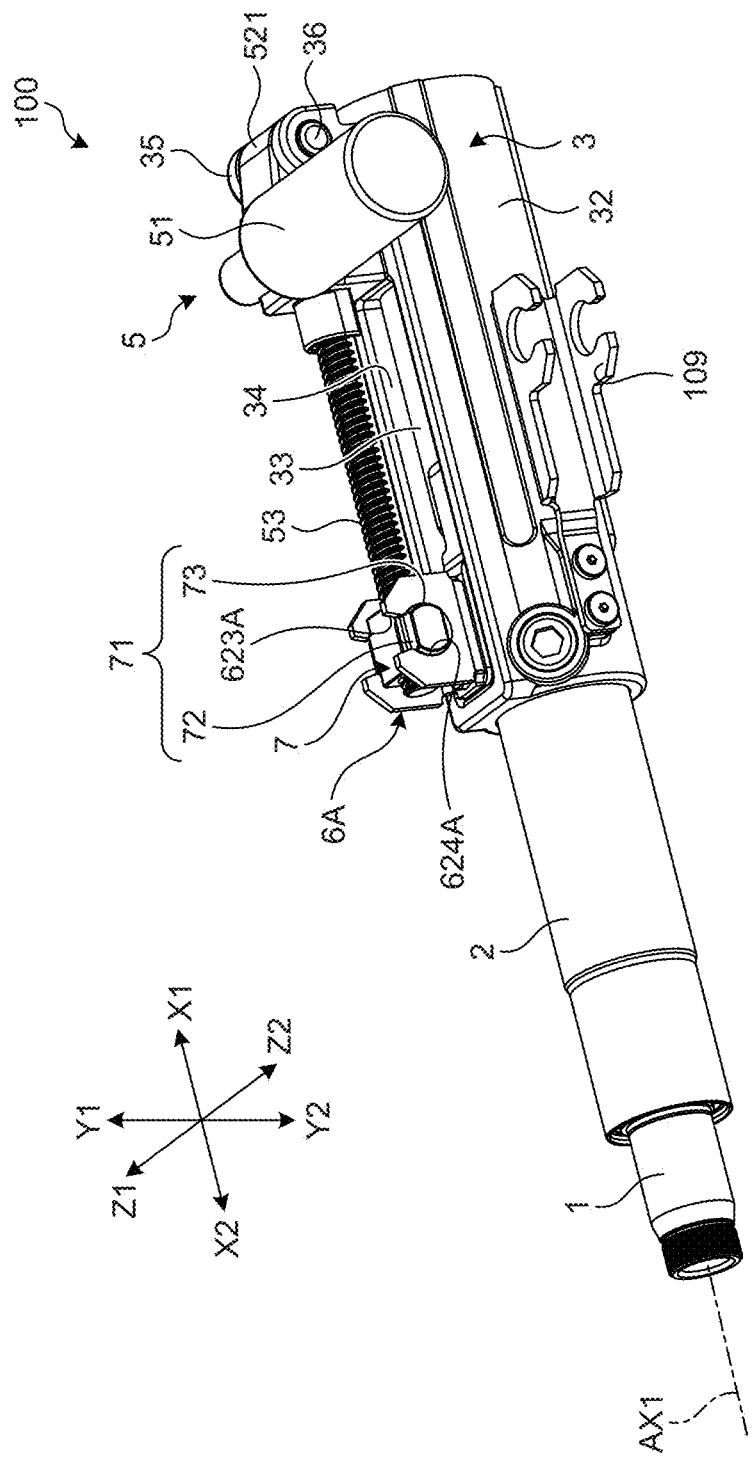
FIG. 9 is a perspective view illustrating a part of the steering device of the second embodiment, and is a view illustrating a state in which the actuator device is assembled.

FIG. 7 is a plan view of a bracket in a second embodiment. FIG. 8 is a perspective view illustrating a part of a steering device of the second embodiment, and is a view illustrating a state in which an actuator device is detached. FIG. 9 is a perspective view illustrating a part of the steering device of the second embodiment, and is a view illustrating a state in which the actuator device is assembled. The second embodiment is different from the first embodiment in a shape of a bracket 6A. Hereinafter, a specific description will be made.

As illustrated in FIG. 7, the bracket 6A includes an attachment portion 61 and a plate portion 62. An opening portion 66 and a housing portion 63 are provided in the plate portion 62 when viewed in the Z direction. A pair of inlet wall portions 623A facing the opening portion 66 is provided in the plate portion 62. Specifically, a top surface portion 621, the inlet wall portions 623A, and a second arc portion 624 are provided in the plate portion 62. The inlet wall portions 623A extend obliquely in a Y direction and an X direction. The inlet wall portion 623A on an X1 side extends obliquely toward a Y2 side and an X2 side. The inlet wall portion 623A on the X2 side extends obliquely toward the Y2 side and the X1 side. In other words, when viewed in a Z direction, each of the pair of inlet wall portions 623A is inclined in such a manner that a distance in the X direction decreases from a Y1 side toward the Y2 side.

Here, a minimum width of the opening portion 66 in the bracket 6A is a first distance L1. Specifically, a distance between end portions on the Y2 side of the pair of inlet wall portions 623A in the X direction is the first distance L1. In addition, a diameter of a second arc portion 624 is a second distance L2. In a state in which the nut 7 is detached from the bracket 6A, the first distance L1 is longer than a fourth distance L4 and shorter than a third distance L3. The second distance L2 is longer than the first distance L1 and the fourth distance L4 and shorter than the third distance L3.

Next, a procedure of attaching an actuator device 5 to a bracket 6 and flanges 35 is similar to that in the first embodiment. That is, first, as illustrated in FIG. 8, the actuator device 5 is arranged in the Y direction, and the nut 7 is assembled to the bracket 6A.

Next, the actuator device 5 is rotated about the nut 7 in such a manner as to inclined toward the X1 side as indicated by an arrow P in FIG. 8, and then the pin 36 is caused to penetrate through holes 351 of the flanges 35 and a through hole 522 of a protruding portion 521 and a snap ring 37 is fitted to an end portion of the pin 36 as illustrated in FIG. 9.

As described above, each of the pair of inlet wall portions 623A is inclined in such a manner that the distance in the X direction decreases from the Y1 side toward the Y2 side. As described above, since the opening portion 66 of the bracket 6A is widened on the inlet side, there is an advantage that the protrusion portion 71 of the nut 7 can be easily inserted into the opening portion 66.

Modification Example of the Second Embodiment

Figure 10:
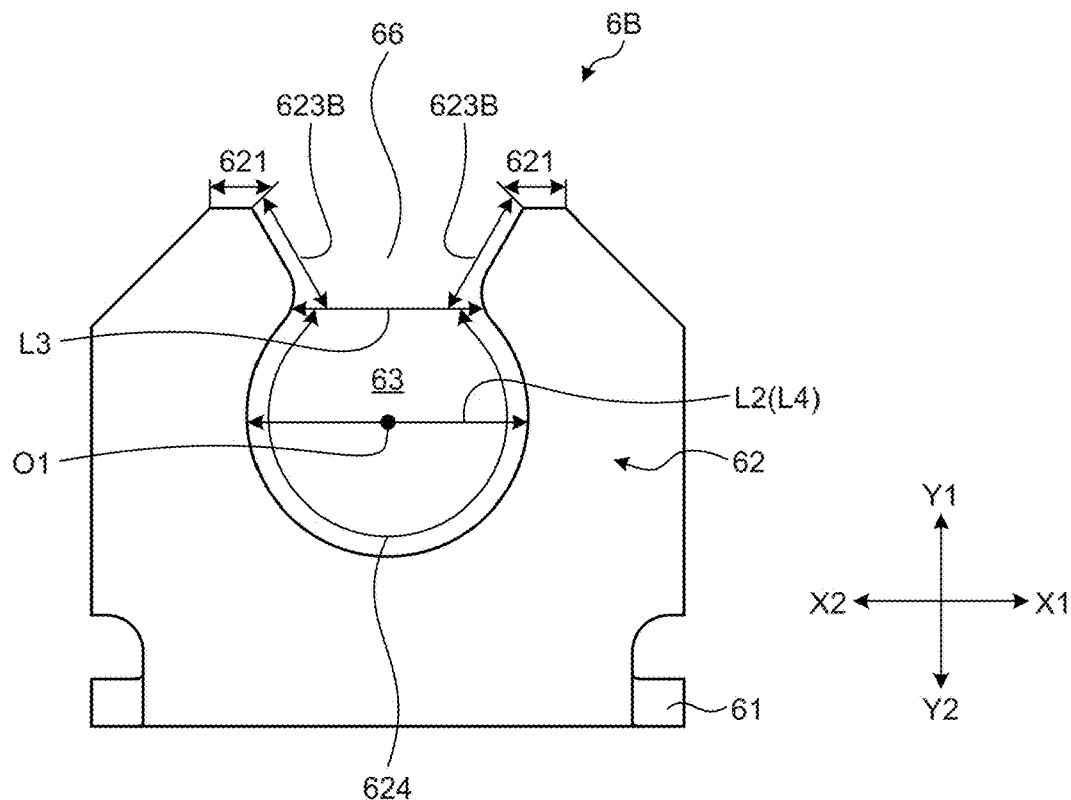
FIG. 10 is a plan view of a bracket according to a modification example of the second embodiment.

FIG. 10 is a plan view of a bracket according to a modification example of the second embodiment. The modification example of the second embodiment is different from the second embodiment in a shape of a bracket 6B. Hereinafter, a specific description will be made.

As illustrated in FIG. 10, in a bracket 6B, a plate portion 62 is provided with a pair of inlet wall portions 623B facing an opening portion 66. Specifically, a top surface portion 621, the inlet wall portions 623B, and a second arc portion 624 are provided in the plate portion 62. The inlet wall portions 623B extend obliquely in a Y direction and an X direction. The inlet wall portion 623A on an X1 side extends obliquely toward a Y2 side and an X2 side. The inlet wall portion 623A on the X2 side extends obliquely toward the Y2 side and the X1 side. In other words, when viewed in a Z direction, each of the pair of inlet wall portions 623A is inclined in such a manner that a distance in the X direction decreases from a Y1 side toward the Y2 side. Here, an inclination angle of the inlet wall portions 623B is larger than an inclination angle of the inlet wall portions 623A. Specifically, the inclination angle of the inlet wall portions 623B is, for example, 30 degrees in the Y direction, and the inclination angle of the inlet wall portions 623A is, for example, 15 degrees in the Y direction.

As described above, also in the modification example of the second embodiment, since the opening portion 66 of the bracket 6B is widened on the inlet side, there is an advantage that a protrusion portion 71 of a nut 7 is easily inserted into the opening portion 66.

Third Embodiment

Figure 11:
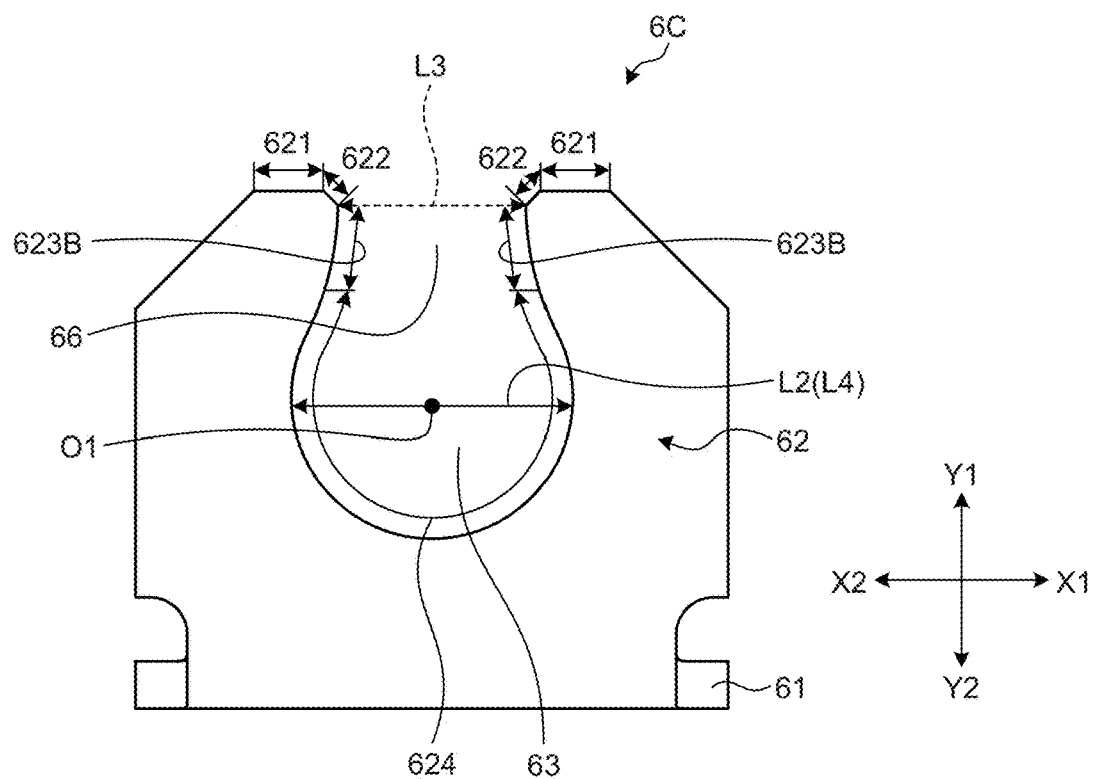
FIG. 11 is a plan view of a bracket according to a third embodiment.
Figure 12:
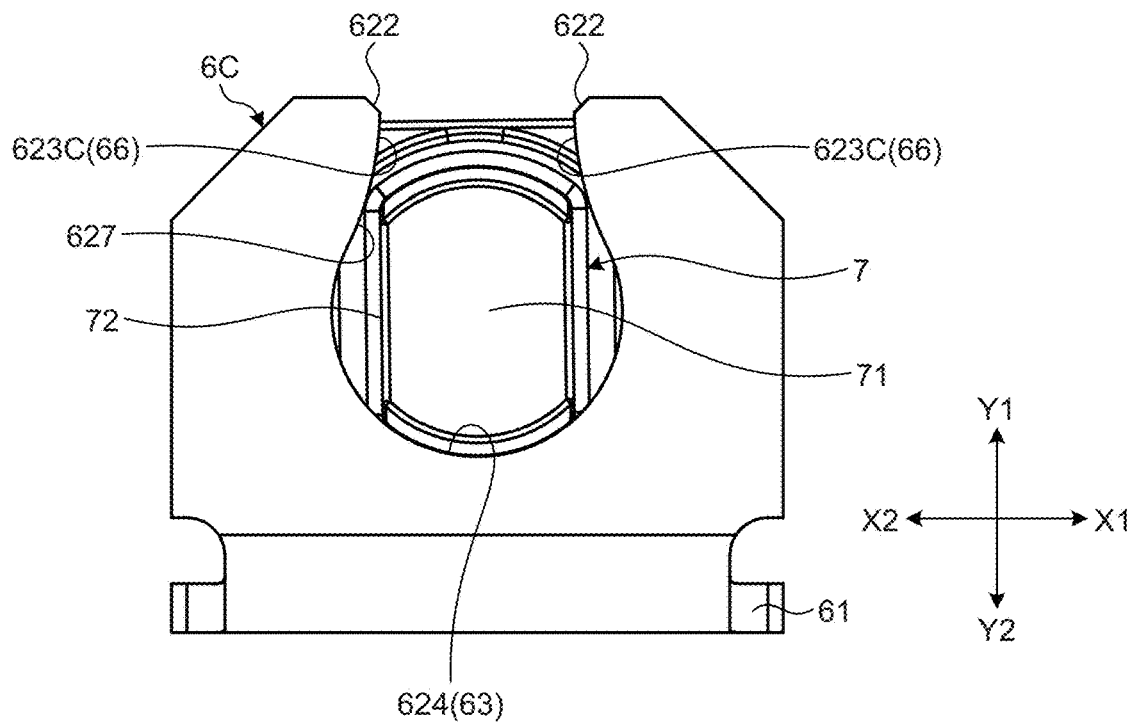
FIG. 12 is a schematic diagram illustrating a state in which a protrusion portion of a nut in an actuator device is inserted into the bracket of FIG. 11.
Figure 13:
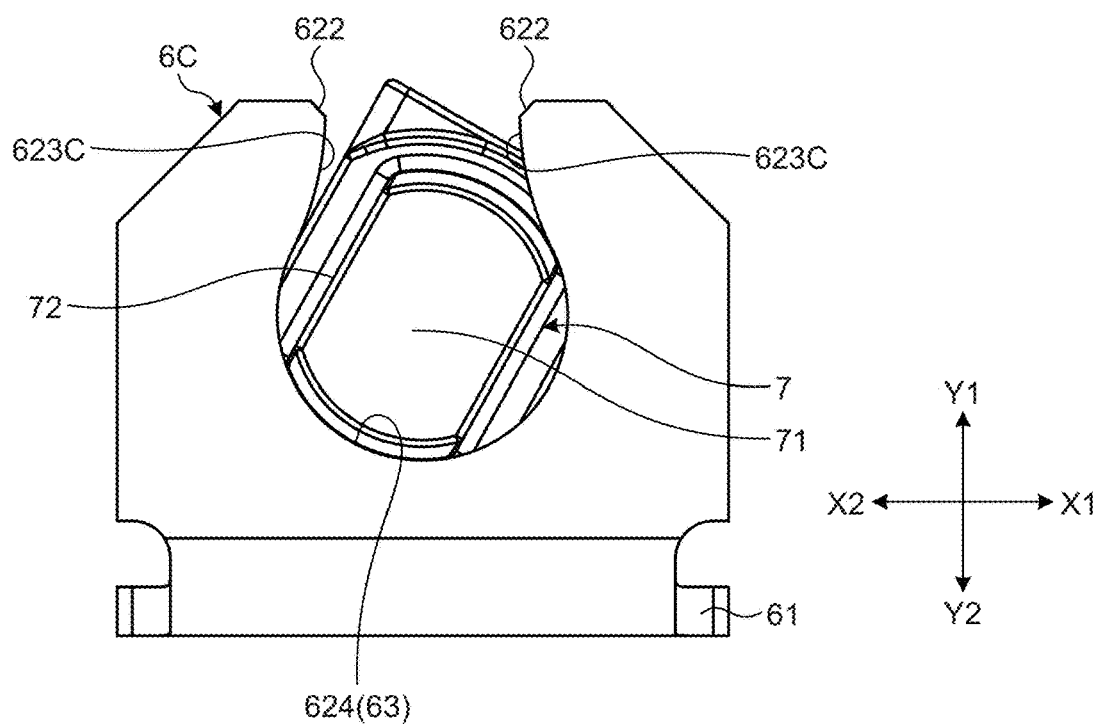
FIG. 13 is a schematic diagram illustrating a state in which the nut of FIG. 12 is rotated.

FIG. 11 is a plan view of a bracket according to the third embodiment. FIG. 12 is a schematic diagram illustrating a state in which a protrusion portion of a nut in an actuator device is inserted into the bracket of FIG. 11. FIG. 13 is a schematic diagram illustrating a state in which the nut of FIG. 12 is rotated.

The third embodiment is different from the first embodiment in a shape of a bracket 6C. Hereinafter, a specific description will be made.

As illustrated in FIG. 11, in the bracket 6C, a plate portion 62 is provided with a pair of inlet wall portions 623C facing an opening portion 66. The inlet wall portions 623C extend obliquely in a Y direction and an X direction. The inlet wall portion 623C on an X1 side extends obliquely toward a Y2 side and the X1 side. The inlet wall portion 623C on an X2 side extends obliquely toward the Y2 side and the X2 side. In other words, when viewed in a Z direction, a distance in the X direction of each of the pair of inlet wall portions 623A increases from the Y1 side toward the Y2 side. In addition, the inlet wall portions 623C are curved portions that are curved. Specifically, the inlet wall portions 623C are curved portions protruding toward a side of the opening portion 66. In addition, a boundary portion between the inlet wall portions 623C and a second arc portion 624 is also smoothly curved. Specifically, the boundary portion between the inlet wall portions 623C and the second arc portion 624 is a curved portion 627 (see FIG. 12) protruding toward the side of the opening portion 66 or a side of a housing portion 63.

Then, when the actuator device 5 is rotated about a nut 7 in such a manner as to be inclined toward the X1 side, a corner portion between a first arc portion 73 and a linear portion 72 in a protrusion portion 71 of the nut 7 is less likely to be caught by the housing portion 63, and the protrusion portion 71 smoothly rotates as illustrated in FIG. 12 and FIG. 13.

As described above, the boundary portion between the inlet wall portions 623C and the inner wall portion facing the housing portion 63 is the curved portion 627. Thus, in a case where the protrusion portion 71 is rotated in a state in which the protrusion portion 71 is fitted to the housing portion 63, the protrusion portion 71 is less likely to be caught at the boundary portion between the inlet wall portions 623C and the inner wall portion, and the protrusion portion 71 can be more smoothly fitted to the housing portion 63.

Fourth Embodiment

Figure 14:
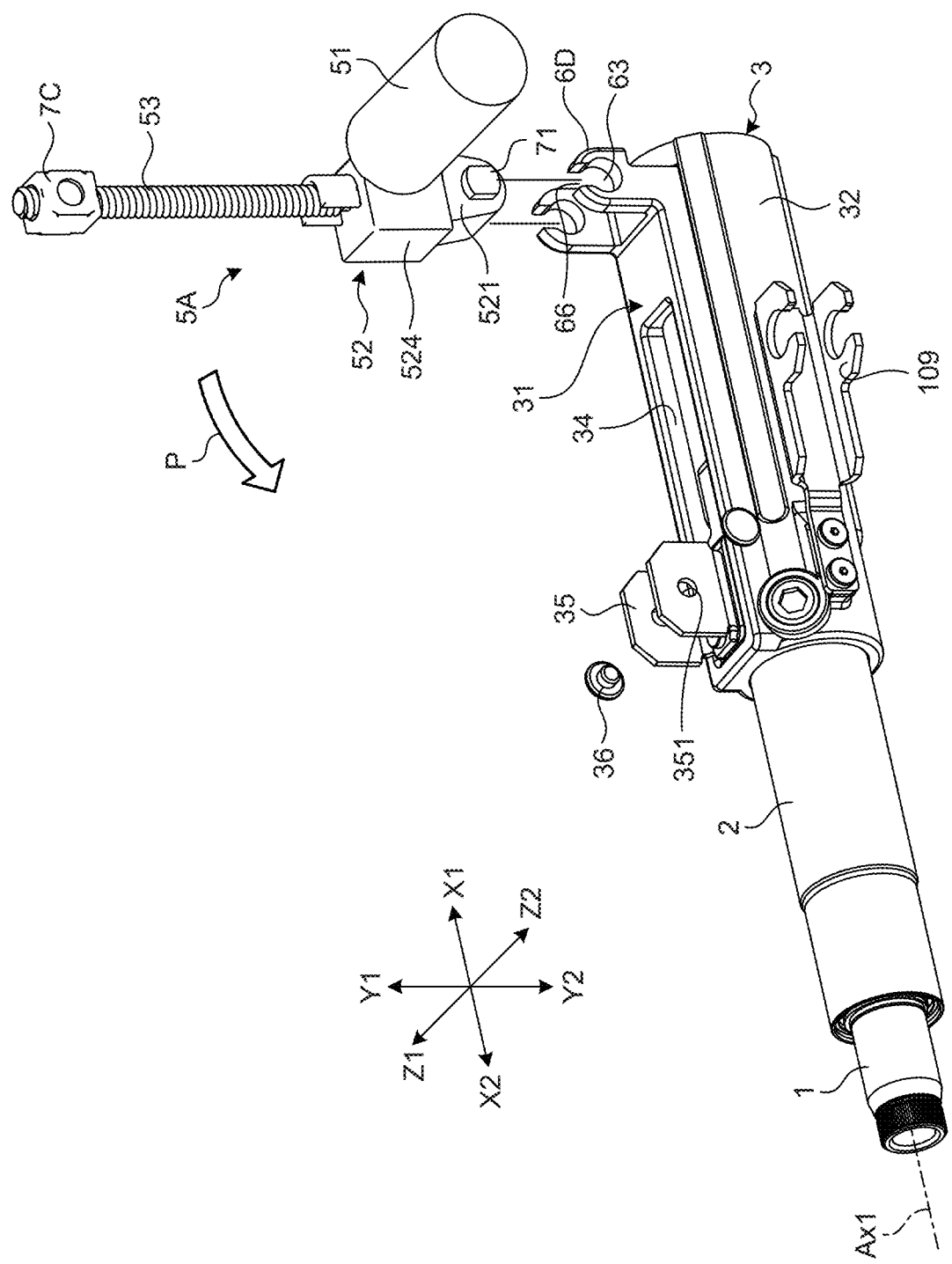
FIG. 14 is a perspective view illustrating a part of a steering device of a fourth embodiment, and is a view illustrating a state in which an actuator device is detached.

FIG. 14 is a perspective view illustrating a part of a steering device of the fourth embodiment, and is a view illustrating a state in which an actuator device is detached. In the steering device of the fourth embodiment, positions of a bracket and a flange are opposite to those of the steering device of the first embodiment. Hereinafter, a specific description will be made.

As illustrated in FIG. 14, flanges 35 protruding toward a Y1 side are provided on a side surface of a first steering column 2. The flanges 35 protrude from an open portion 33 toward the Y1 side. A through hole 351 is provided in each of the flanges 35. A pin 36A is inserted into the through holes 351 and fitted into a recess portion in a side portion of a nut 7C, whereby the nut 7C is attached to the flanges 35 via the pin 36A. A bracket 6D is provided at an end portion of a flat portion 31 on a X1 side. A protrusion portion 71 of an actuator device 5A is inserted from an opening portion 66 of the bracket 6D and fitted into a housing portion 63.

As described above, also according to the present embodiment, after the protrusion portion 71 of the nut 7C is inserted into the housing portion 63 from the opening portion 66 of the bracket 6D, the actuator device 5A can be swung about the protrusion portion 71 and the nut 7C can be attached to the flanges 35.

Fifth Embodiment and Modification Example

Figure 15:
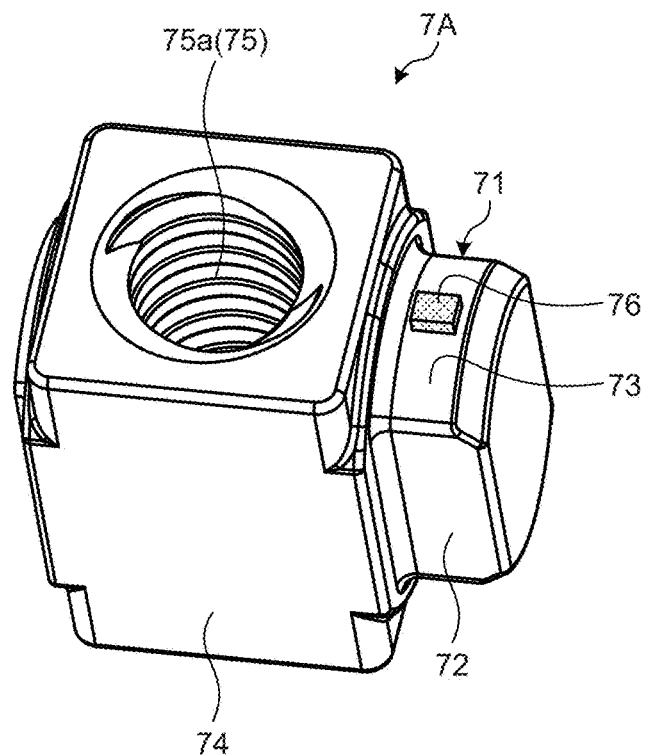
FIG. 15 is a perspective view of a nut according to a fifth embodiment.
Figure 16:
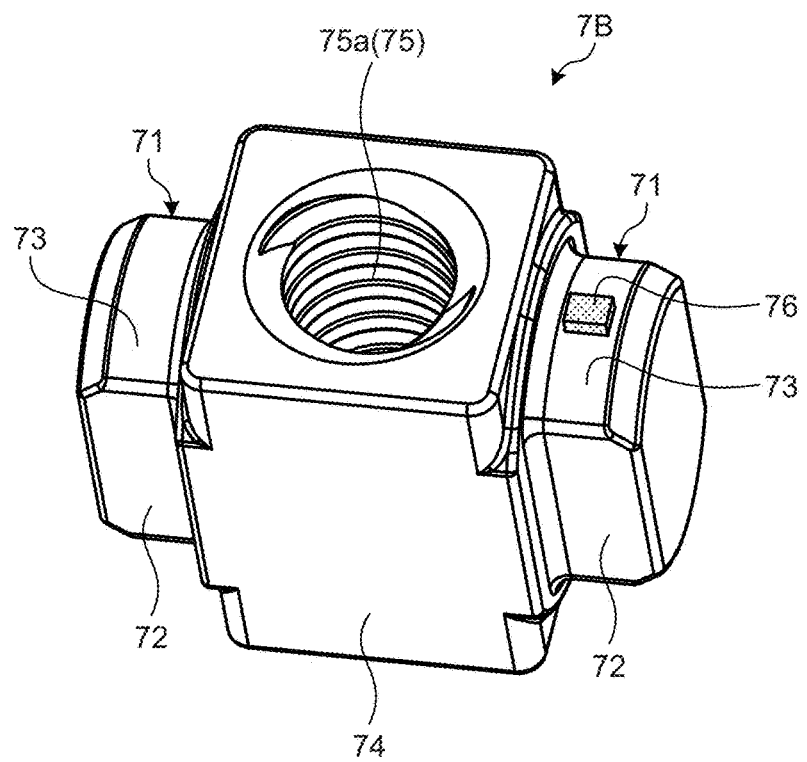
FIG. 16 is a perspective view of a nut according to a modification example of the fifth embodiment.
Figure 17:
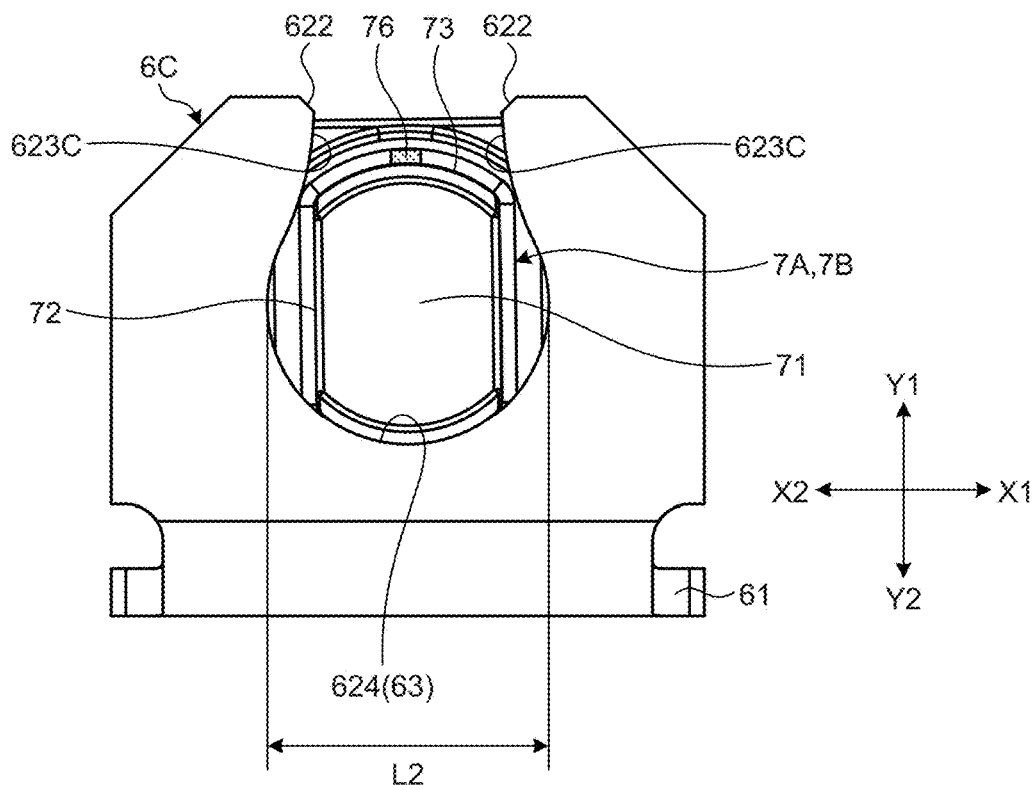
FIG. 17 is a schematic diagram illustrating a state in which a protrusion portion of the nut of FIG. 15 or 16 is inserted into a bracket.
Figure 18:
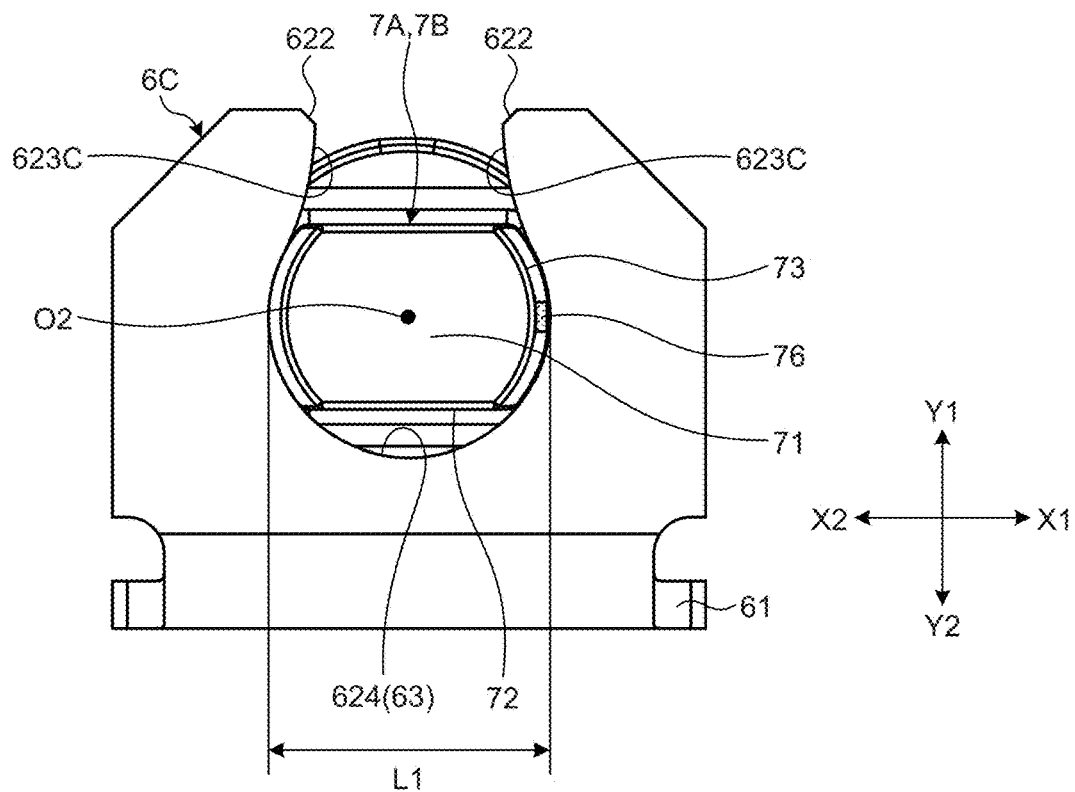
FIG. 18 is a schematic diagram illustrating a state in which the nut of FIG. 17 is rotated.

FIG. 15 is a perspective view of a nut according to the fifth embodiment. FIG. 16 is a perspective view of a nut according to the modification example of the fifth embodiment. FIG. 17 is a schematic diagram illustrating a state in which a protrusion portion of the nut of FIG. 15 or FIG. 16 is inserted into a bracket. FIG. 18 is a schematic diagram illustrating a state in which the nut of FIG. 17 is rotated.

As illustrated in FIG. 15, a nut 7A according to the fifth embodiment is different from the nut 7 according to the first embodiment in a point that a projection portion 76 is provided on a first arc portion 73 of a protrusion portion 71. Specifically, the nut 7A includes a nut main body portion 74 and the protrusion portion 71. The projection portion 76 is provided on the first arc portion 73 of the protrusion portion 71. The projection portion 76 is a substantially rectangular parallelepiped. A top surface of the projection portion 76 is curved in an arc shape. For example, a curvature radius of the top surface of the projection portion 76 is substantially the same as that of the first arc portion 73.

As illustrated in FIG. 16, a nut 7B according to the modification example of the fifth embodiment is different from the nut 7A according to the fifth embodiment in a point that two protrusion portions 71 are provided. Specifically, the nut 7B includes a nut main body portion 74 and the two protrusion portions 71. A projection portion 76 is provided on a first arc portion 73 of one of the protrusion portions 71. The projection portion 76 is a substantially rectangular parallelepiped. A top surface of the projection portion 76 is curved in an arc shape. For example, a curvature radius of the top surface of the projection portion 76 is substantially the same as that of the first arc portion 73. Note that the projection portion 76 is not provided on a first arc portion 73 of the other protrusion portion 71.

Then, as illustrated in FIG. 17 and FIG. 18, when the nuts 7A and 7B are rotated, the projection portions 76 of the protrusion portions 71 come into contact with second arc portions 624 (inner wall portions) of the nuts 7A and 7B. Note that the projection portions 76 may be deformed in a crushed manner by the second arc portions 624.

In the present embodiment, in a straight line passing through a center O2 of the first arc portion 73 of the protrusion portion 71 and the projection portion 76, a distance from an intersection of the straight line and the first arc portion 73 to an intersection of the straight line and an outer peripheral end of the projection portion 76 is a first distance L1. Note that the first distance L1 is longer than a second distance L2. Thus, as described above, there is a case where the projection portion 76 is crushed by the second arc portion 624. In addition, in the protrusion portion 71, a diameter of a circle along the first arc portion 73 is smaller than the second distance L2 that is a diameter of a circle along the second arc portion 624.

As described above, according to the present embodiment, since the projection portion 76 is provided on the protrusion portion 71, when the protrusion portion 71 is rotated in a state in which the protrusion portion 71 is fitted to the housing portion 63, the projection portion 76 easily abuts on the inner wall portion of the housing portion 63 more securely. That is, when an entire surface of the first arc portion 73 of the protrusion portion 71 is moved outward in a radial direction and a diameter of the first arc portion 73 is increased, the first arc portion 73 and the housing portion 63 abut on each other over a large area. In this case, when the curvature radius of the first arc portion 73 varies, the entire surface of the first arc portion 73 is less likely to uniformly abut on the housing portion 63. On the other hand, since the projection portion 76 has a smaller abutment area with the inner wall portion of the housing portion 63 than the entire surface of the first arc portion 73, the projection portion 76 more securely abuts on the inner wall portion of the housing portion 63, and a gap is less likely to be generated between the protrusion portion 71 and the housing portion 63.

In addition, in the nut 7B, when the projection portions 76 are provided on both the one protrusion portion 71 and the other protrusion portion 71, a press fit margin between the protrusion portions 71 and the housing portion 63 increases in both the one protrusion portion 71 and the other protrusion portion 71. In this case, when a posture of the nut 7 is twisted, a screw shaft 53 and a nut 7 are easily engaged with each other, and it becomes difficult for the screw shaft 53 to rotate smoothly.

However, according to the nut 7B, since the projection portion 76 is not provided on one of the two protrusion portions 71, the posture of the nut 7 is less likely to be twisted, and the screw shaft 53 and the nut 7 are less likely to be caught. Thus, it is possible to obtain both an effect that the screw shaft 53 rotates smoothly due to the protrusion portion 71 not provided with the projection portion 76 and an effect that generation of a gap between the housing portion 63 and the protrusion portion 71 is more effectively controlled by the protrusion portion 71 provided with the projection portion 76.

Sixth Embodiment

Figure 19:
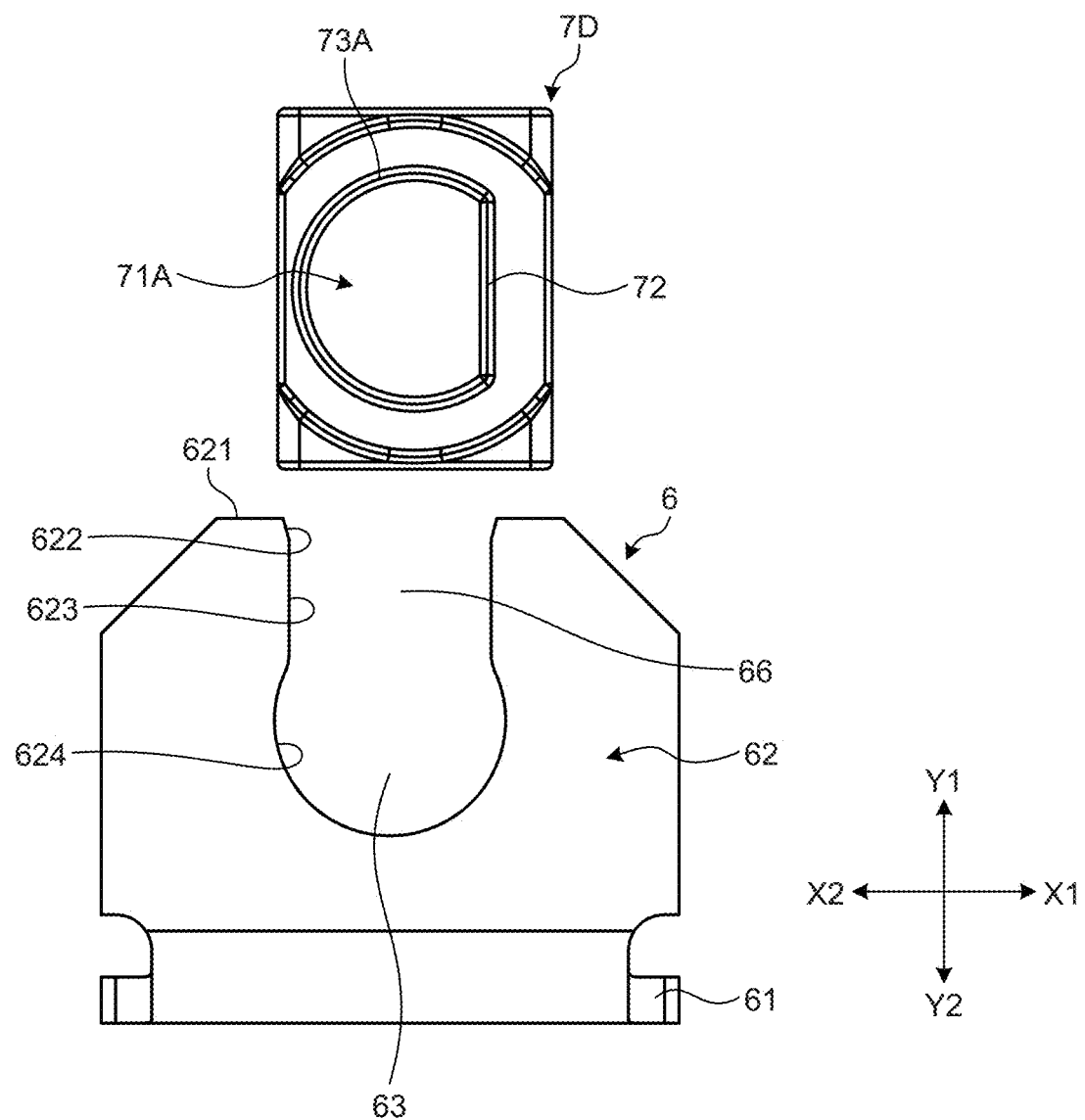
FIG. 19 is a plan view illustrating a nut and a bracket according to a sixth embodiment.
Figure 20:
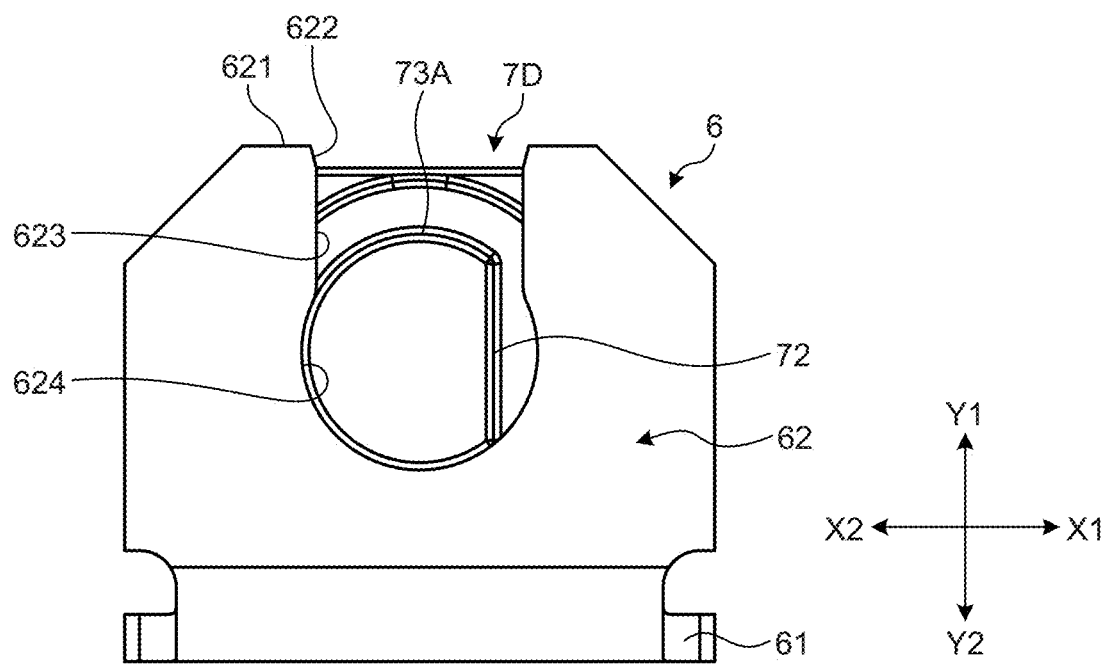
FIG. 20 is a schematic diagram illustrating a state in which a protrusion portion of the nut of FIG. 15 is inserted into the bracket.
Figure 21:
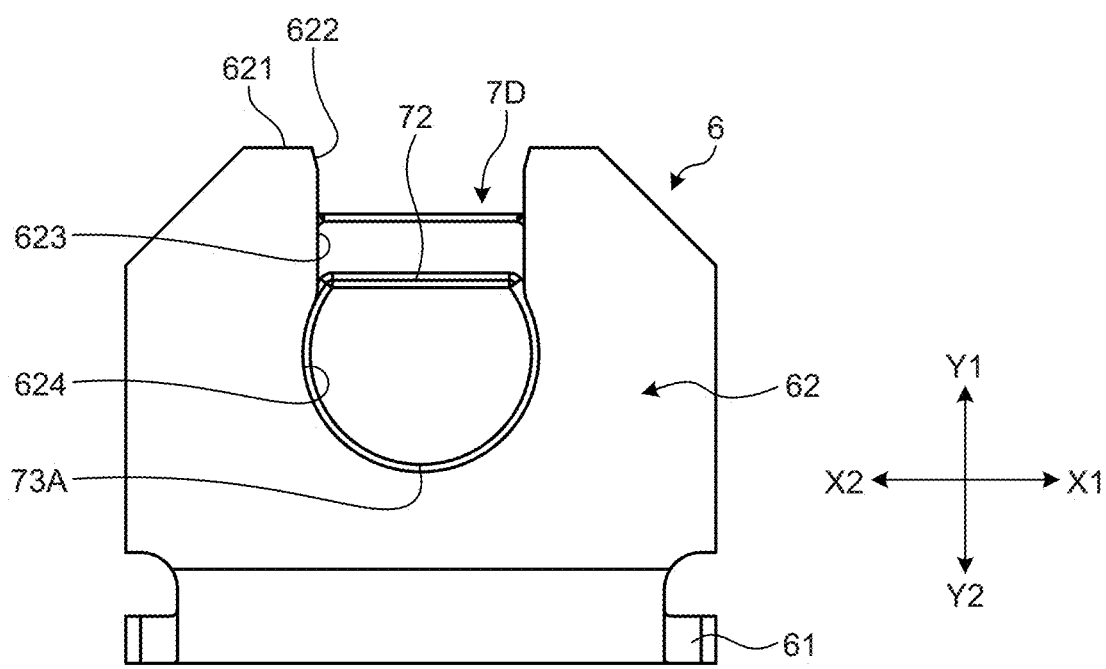
FIG. 21 is a schematic diagram illustrating a state in which the nut of FIG. 20 is rotated.

FIG. 19 is a plan view illustrating a nut and a bracket according to the sixth embodiment. FIG. 20 is a schematic diagram illustrating a state in which a protrusion portion of the nut of FIG. 15 is inserted into the bracket. FIG. 21 is a schematic diagram illustrating a state in which the nut of FIG. 20 is rotated. The nut according to the sixth embodiment is different from the nut according to the first embodiment in a shape of a protrusion portion.

That is, while the protrusion portion 71 of the nut 7 according to the first embodiment has two linear portions 72, a protrusion portion 71A of the nut according to the sixth embodiment has one linear portion 72 as illustrated in FIG. 19. A diameter of a circle along a second arc portion 624 is a fourth distance L4. Also in the sixth embodiment, the first distance L1 is larger than the fourth distance L4. According to the sixth embodiment, as illustrated in FIG. 20 and FIG. 21, the nut 7D can be inserted from the opening portion 66 and rotated in the housing portion 63.

Seventh Embodiment

Figure 22:
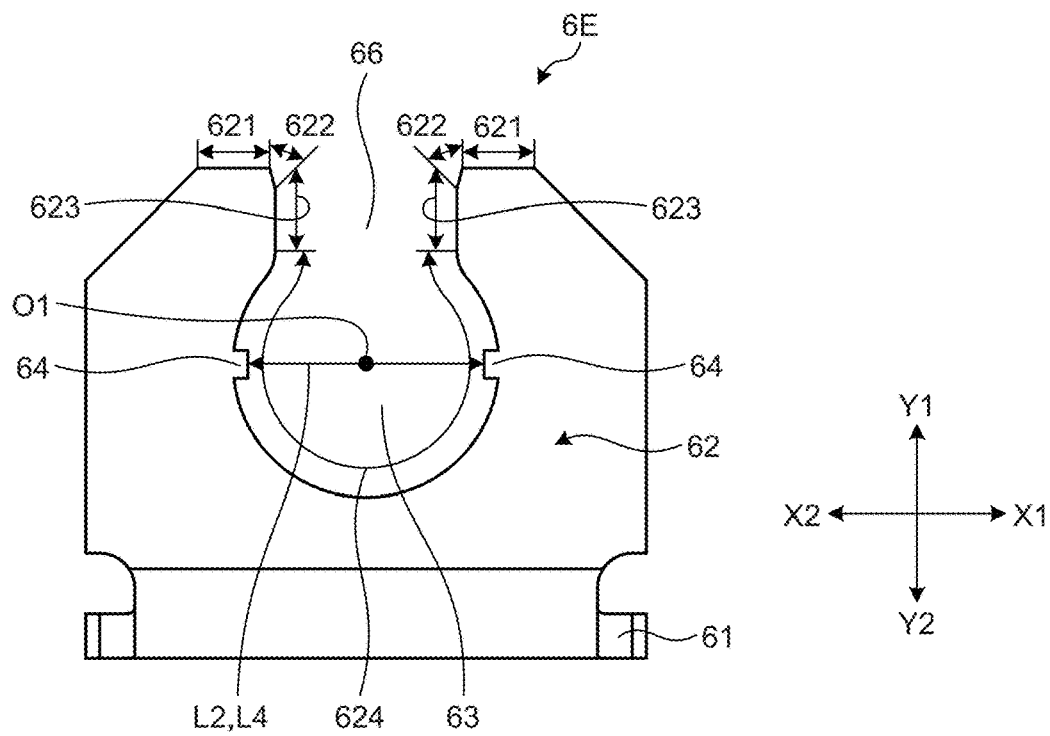
FIG. 22 is a plan view illustrating a bracket according to a seventh embodiment.

FIG. 22 is a plan view illustrating a bracket according to the seventh embodiment. A bracket 6E according to the seventh embodiment is different from the bracket 6 according to the first embodiment in a point that projecting portions 64 are provided. The projecting portions 64 project toward an inner peripheral side from a second arc portion 624 (inner wall portion) facing a housing portion 63. The two projecting portions 64 are provided with a center O1 of the housing portion 63 being interposed therebetween. The projecting portion 64 has a substantially rectangular shape when viewed in a Z direction. A second distance L2 and a fourth distance L4 are lengths of line segments passing through the center O1 and connecting the two projecting portions 64.

As described above, in the seventh embodiment, since the projecting portions 64 are provided on the inner periphery of the second arc portion 624 (inner wall portion), when the protrusion portion 71 is rotated in a state in which the protrusion portion 71 is fitted to the housing portion 63, the protrusion portion 71 more securely abuts on the inner wall portion of the housing portion 63. Thus, a gap between the housing portion 63 and the protrusion portion 71 can be more effectively controlled. Note that similarly to the projection portion 76 described with reference to FIG. 15 and FIG. 16, there is a case where the projecting portion 64 is deformed in a crushed manner by the protrusion portion 71. In this case, the protrusion portion 71 is more securely fitted to the housing portion 63.

Eighth Embodiment

Figure 23:
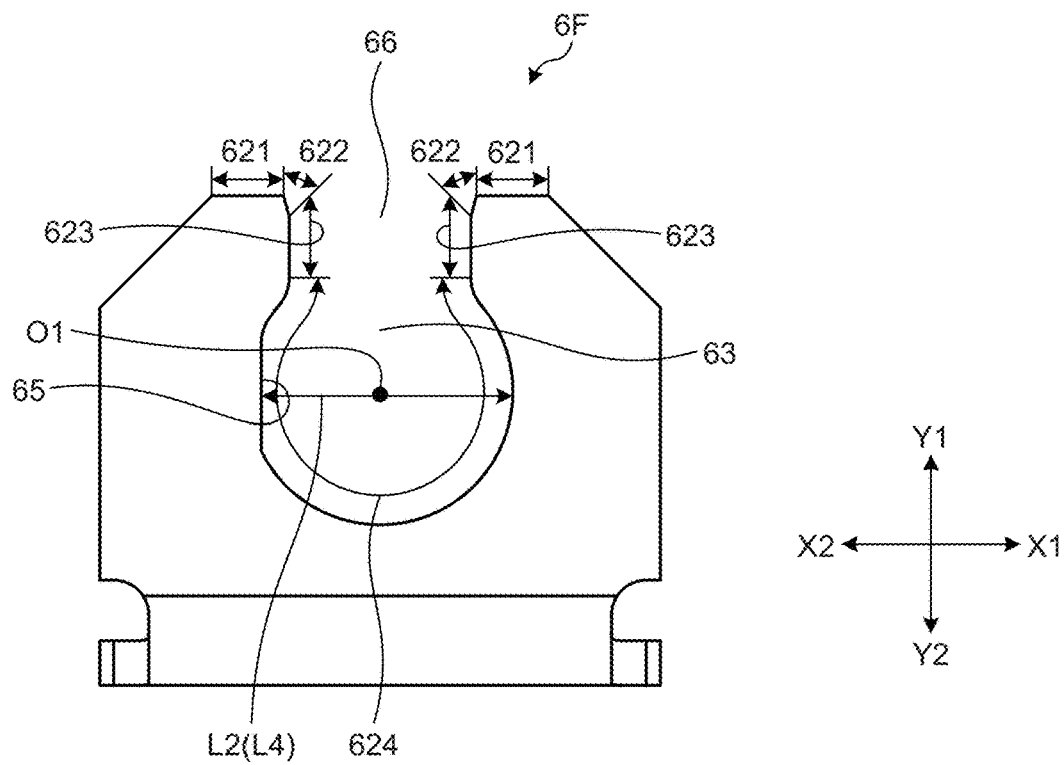
FIG. 23 is a plan view illustrating a bracket according to an eighth embodiment.

FIG. 23 is a plan view of a bracket according to the eighth embodiment. A bracket 6F according to the eighth embodiment is different from the bracket 6 according to the first embodiment in a point that a projecting portion 65 is provided. The projecting portion 65 projects from a second arc portion 624 toward an inner peripheral side. An edge of the projecting portion 65 is a straight line extending in a Y direction when viewed in a Z direction. The one projecting portion 65 is provided. Two pieces are provided with a center of a housing portion 63 being interposed therebetween. The projecting portion 64 has a substantially rectangular shape when viewed in the Z direction. In a line segment passing through a center O1 and being orthogonal to the projecting portion 65, a second distance L2 and a fourth distance L4 are lengths from the projecting portion 65 to the second arc portion 624 in the line segment.

As described above, in the eighth embodiment, since the projecting portion 65 is provided on the inner periphery of the second arc portion 624 (inner wall portion), a protrusion portion 71 comes into contact with the projecting portion 65 when the protrusion portion 71 is rotated in a state in which the protrusion portion 71 is fitted to the housing portion, and pressing force acts on the protrusion portion 71 from the projecting portion 65. As a result, it is possible to more effectively control generation of a gap between the housing portion 63 and the protrusion portion 71 of the actuator device 5.

REFERENCE SIGNS LIST

1 STEERING SHAFT
2 FIRST STEERING COLUMN
3 SECOND STEERING COLUMN
31 FLAT PORTION
32 CURVED PORTION
33 OPEN PORTION
34 INNER PERIPHERAL WALL PORTION
35 FLANGE (SECOND ATTACHMENT PORTION)
351 THROUGH HOLE
36, 36A PIN
37 SNAP RING
4 THIRD STEERING COLUMN
5 ACTUATOR DEVICE
5A ACTUATOR DEVICE
51 MOTOR
52 GEAR BOX (SECOND FIXATION PORTION)
521 PROTRUDING PORTION
522 THROUGH HOLE
524 HOUSING
53 SCREW SHAFT
6, 6A, 6B, 6C, 6D, 6E, 6F BRACKET (FIRST ATTACHMENT PORTION)
61 ATTACHMENT PORTION
62 PLATE PORTION
621 TOP SURFACE PORTION
622 CORNER PORTION
623, 623A, 623B INLET WALL PORTION
624 SECOND ARC PORTION (INNER WALL PORTION)
625 FIRST HOLDING PORTION
626 SECOND HOLDING PORTION
627 CURVED PORTION
63 HOUSING PORTION
64 PROJECTING PORTION
65 PROJECTING PORTION
66 OPENING PORTION
7, 7A, 7B, 7C, 7D NUT (FIRST FIXATION PORTION)
71, 71A PROTRUSION PORTION
72 LINEAR PORTION
73 FIRST ARC PORTION
74 NUT MAIN BODY PORTION
76 PROJECTION PORTION
100 STEERING DEVICE
101 GEAR BOX
102 ELECTRIC MOTOR
104 ECU
105 STEERING WHEEL
106 MOTOR
107 GEAR BOX
108 SCREW SHAFT
109 BRACKET
112 ACTUATOR DEVICE
AX1 FIRST CENTRAL AXIS
AX2 SECOND CENTRAL AXIS
AX3 THIRD CENTRAL AXIS

The invention claimed is:
1. A steering device comprising:
a tubular first steering column that is arranged outside a steering shaft extending in a first direction and has a first attachment portion;
a tubular second steering column that is arranged outside the first steering column and has a second attachment portion arranged on one side in the first direction with respect to the first attachment portion; and
an actuator device that includes a first fixation portion attached to one of the first attachment portion or the second attachment portion and a second fixation portion attached to other of the first attachment portion or the second attachment portion, and changes a relative distance between the first fixation portion and the second fixation portion in the first direction, wherein
the first attachment portion or the second attachment portion includes an inlet-side opening portion and a housing portion that communicates with the opening portion,
the first fixation portion includes a protrusion portion protruding in a second direction intersecting with the first direction, when viewed in the second direction, the protrusion portion has a first arc portion and a linear portion and can be housed in the housing portion, the linear portion extending in the first direction in a state in which the protrusion portion is housed in the housing portion, and in a state in which the first fixation portion is detached from the first attachment portion or the second attachment portion and the linear portion extends in the first direction, when viewed in the second direction, a first distance that is a maximum distance in the first direction in the protrusion portion is longer than a second distance that is a maximum distance in the first direction in the housing portion.

2. The steering device according to claim 1, wherein in a case where a minimum width of the opening portion in the first attachment portion or the second attachment portion is defined as a third distance, the housing portion includes a second arc portion, a minimum distance between two intersections of a straight line passing through a center of the second arc portion and an inner wall portion facing the housing portion is defined as a fourth distance, and a maximum distance between two intersections of a straight line passing through a center of the first arc portion of the protrusion portion and an edge of the protrusion portion is defined as a fifth distance and a minimum distance is defined as a sixth distance, in a state in which the first fixation portion is detached from the first attachment portion or the second attachment portion, the sixth distance is shorter than the third distance, and the fifth distance is longer than the fourth distance.

3. The steering device according to claim 1, wherein the first attachment portion or the second attachment portion includes a first holding portion and a second holding portion arranged on one side and other side in the first direction with the opening portion and the housing portion being interposed therebetween, and distances of the first holding portion and the second holding portion in the first direction are same.

4. The steering device according to claim 2, wherein the first attachment portion or the second attachment portion includes a first holding portion and a second holding portion arranged on one side and other side in the first direction with the opening portion and the housing portion being interposed therebetween, and distances of the first holding portion and the second holding portion in the first direction are same.

5. The steering device according to claim 1, wherein the first attachment portion or the second attachment portion is provided with a pair of inlet wall portions facing the opening portion, and when viewed in the second direction, each of the pair of inlet wall portions extends in a third direction intersecting with the first direction and the second direction.

6. The steering device according to claim 1, wherein the first attachment portion or the second attachment portion is provided with a pair of inlet wall portions facing the opening portion, and when viewed in the second direction, each of the pair of inlet wall portions is inclined in such a manner that a distance in the first direction decreases from one side to another side in a third direction.

7. The steering device according to claim 1, wherein the first attachment portion or the second attachment portion is provided with a pair of inlet wall portions facing the opening portion, and when viewed in a third direction, a boundary portion between the inlet wall portions and an inner wall portion facing the housing portion is a curved portion.

8. The steering device according to claim 1, wherein a projection portion is provided in the first arc portion of the protrusion portion.

9. The steering device according to claim 8, wherein a nut includes a nut main body portion and the protrusion portion, the protrusion portion being provided on each side of the nut main body portion in the second direction, and the projection portion is provided on the protrusion portion on one side in the second direction.

10. The steering device according to claim 1, wherein a projecting portion projecting toward an inner peripheral side is provided on an inner periphery of an inner wall portion facing the housing portion in the first attachment portion or the second attachment portion.

11. A manufacturing method of a steering device, the steering device including a tubular first steering column that is arranged outside a steering shaft extending in a first direction and that has a first attachment portion, a tubular second steering column that is arranged outside the first steering column and has a second attachment portion arranged on one side in the first direction with respect to the first attachment portion, and an actuator device that includes a first fixation portion attached to one of the first attachment portion or the second attachment portion and a second fixation portion attached to other of the first attachment portion or the second attachment portion, and that changes a relative distance between the first fixation portion and the second fixation portion in the first direction, the first attachment portion or the second attachment portion including an inlet-side opening portion and a housing portion communicating with the opening portion, the first fixation portion including a protrusion portion protruding in a second direction intersecting with the first direction, when viewed in the second direction, the protrusion portion having a first arc portion and a linear portion and being able to be housed in the housing portion, and the linear portion extending in the first direction in a state in which the protrusion portion is housed in the housing portion, and in a state in which the first fixation portion is detached from the first attachment portion or the second attachment portion, a first distance in the first direction in the protrusion portion being longer than a second distance in the first direction in the housing portion when viewed in the second direction, the manufacturing method comprising:

a first step of arranging the actuator device in such a manner that the first fixation portion is located on one side in a third direction, which intersects with the first direction and the second direction, with respect to the one of the first attachment portion or the second attachment portion in a state in which the linear portion of the protrusion portion is in the third direction;

a second step of moving the actuator device toward other side in the third direction and inserting the protrusion portion of the first fixation portion into the housing portion from the opening portion after the first step;

a third step of swinging the actuator device about the protrusion portion and fitting the protrusion portion into the housing portion after the second step; and a fourth step of attaching the second fixation portion to the other of the first attachment portion or the second attachment portion after the third step.

* * * * *